(12) United States Patent
Routledge et al.

(10) Patent No.: US 12,184,174 B2
(45) Date of Patent: Dec. 31, 2024

(54) REDUCED GATE DRIVE FOR POWER CONVERTER WITH DYNAMICALLY SWITCHING RATIO

(71) Applicant: Murata Manufacturing Co., Ltd., Kyoto (JP)

(72) Inventors: Antony Christopher Routledge, Basingstoke (GB); Satish Kumar Vangara, Woodley (GB)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 17/960,712

(22) Filed: Oct. 5, 2022

(65) Prior Publication Data
US 2024/0120837 A1   Apr. 11, 2024

(51) Int. Cl.
*H02M 3/157*   (2006.01)
*H02M 1/00*   (2006.01)
(Continued)

(52) U.S. Cl.
CPC ......... *H02M 3/157* (2013.01); *H02M 1/0022* (2021.05); *H02M 1/0038* (2021.05); *H02M 1/08* (2013.01); *H02M 3/07* (2013.01)

(58) Field of Classification Search
CPC ............ H02M 3/00; H02M 3/02; H02M 3/04; H02M 3/06; H02M 3/07–078;
(Continued)

(56) References Cited

U.S. PATENT DOCUMENTS

| | | | |
|---|---|---|---|
| 4,972,097 A | * | 11/1990 | You ........................... G05F 3/24 327/543 |
| 8,049,551 B2 | | 11/2011 | Kotowski et al. |

(Continued)

FOREIGN PATENT DOCUMENTS

| | | |
|---|---|---|
| CN | 113126690 | 7/2021 |
| CN | 216387888 | 4/2022 |

OTHER PUBLICATIONS

Retebo, Metasebia T., Office Action received from the USPTO dated May 6, 22 for U.S. Appl. No. 17/331,594, 21 pgs.
(Continued)

*Primary Examiner* — Thienvu V Tran
*Assistant Examiner* — Carlos O Rivera-Perez
(74) *Attorney, Agent, or Firm* — Haynes and Boone, LLP

(57) ABSTRACT

Circuits and methods for selectable conversion ratio power converters that include low-dropout (LDO) power supplies adapted to select voltage inputs based on the selected conversion ratio while achieving high efficiency. The LDO power supplies limit current through power FETs of power converters, thereby mitigating or eliminating potentially damaging events. In some embodiments, first and second full gate-drive LDOs have "wired-OR" outputs which may power a target circuit such as a pre-driver (and optionally, a level-shifter) coupled to the gate of a power FET. In some embodiments, first and second reduced gate-drive LDOs have "wired-OR" outputs that may power a final driver coupled to the gate of a power FET. Some embodiments have dual full gate-drive LDOs that power a target circuit such as a pre-driver (and optionally, a level-shifter), while dual reduced gate-drive LDOs that power a final driver coupled to the gate of the power FET.

13 Claims, 15 Drawing Sheets

(51) Int. Cl.
*H02M 1/08* (2006.01)
*H02M 3/07* (2006.01)

(58) Field of Classification Search
CPC ...... H02M 3/135; H02M 3/137; H02M 3/139; H02M 3/142; H02M 3/155; H02M 3/156; H02M 3/1563; H02M 3/1566; H02M 3/157; H02M 3/158; H02M 3/1588; H02M 1/0003; H02M 1/0006; H02M 1/0016; H02M 1/0022; H02M 1/0029; H02M 1/0038; H02M 1/0041; H02M 1/08; H02M 1/096; H02M 1/32; H02M 1/36; H03K 17/00; H03K 17/16; H03K 17/161–167; G05F 1/00; G05F 1/10; G05F 1/46; G05F 1/462; G05F 1/465; G05F 1/468; G05F 1/56; G05F 1/561; G05F 1/565; G05F 1/569; G05F 1/575; G05F 1/595; G05F 3/00; G05F 3/02; G05F 3/08; G05F 3/16; G05F 3/18; G05F 3/185; G05F 3/20; G05F 3/205; G05F 3/22; G05F 3/227; G05F 3/24; G05F 3/247; G05F 3/26–267
USPC ........ 323/237, 238, 266, 268–276, 282–285, 323/289, 304, 311–317, 351, 901; 363/49, 50–58; 327/108–112, 333, 530, 327/534, 535, 536, 537, 538, 540, 541, 327/543
See application file for complete search history.

(56) References Cited

U.S. PATENT DOCUMENTS

| | | | |
|---|---|---|---|
| 9,203,299 | B2 | 12/2015 | Low et al. |
| 9,606,555 | B2 | 3/2017 | Saito et al. |
| 10,019,022 | B2* | 7/2018 | Hu .............................. G05F 1/67 |
| 10,263,514 | B1 | 4/2019 | Aboueldahab |
| 10,680,512 | B2 | 6/2020 | Babazadeh et al. |
| 10,749,429 | B2 | 8/2020 | Harvey |
| 2007/0030749 | A1* | 2/2007 | Pyeon ................. G11C 11/4072 365/189.11 |
| 2014/0084896 | A1 | 3/2014 | Zhang et al. |
| 2015/0311884 | A1 | 10/2015 | Saadat et al. |
| 2016/0149478 | A1 | 5/2016 | Low |
| 2018/0269789 | A1 | 9/2018 | Kondo |
| 2019/0173464 | A1* | 6/2019 | Lin ...................... H03K 17/063 |
| 2020/0144925 | A1* | 5/2020 | Hashim ...................... G05F 1/56 |
| 2022/0385178 | A1 | 12/2022 | Routledge et al. |
| 2023/0095105 | A1* | 3/2023 | Brink ................. H02M 1/0048 323/271 |

OTHER PUBLICATIONS

Retebo, Metasebia T., Final Office Action received from the USPTO dated Dec. 14, 22 for U.S. Appl. No. 17/331,594, 13 pgs.
Lee, Kang Ha, International Search Report and Written Opinion received from the KIPO for appln. No. PCT/US2023/075821, 12 pgs.
Retebo, Metasebia T., Final Office Action received from the USPTO dated Nov. 3, 2023 for U.S. Appl. No. 17/331,594, 11 pgs.
Retebo, Metasebia T., Notice of Allowance received from the USPTO dated Nov. 22, 2023 for U.S. Appl. No. 17/331,594, 10 pgs.

* cited by examiner

Dual Full Gate-Driver Sections

Dual Reduced Gate-Driver Sections

Shared Reduced Gate-Driver Circuit

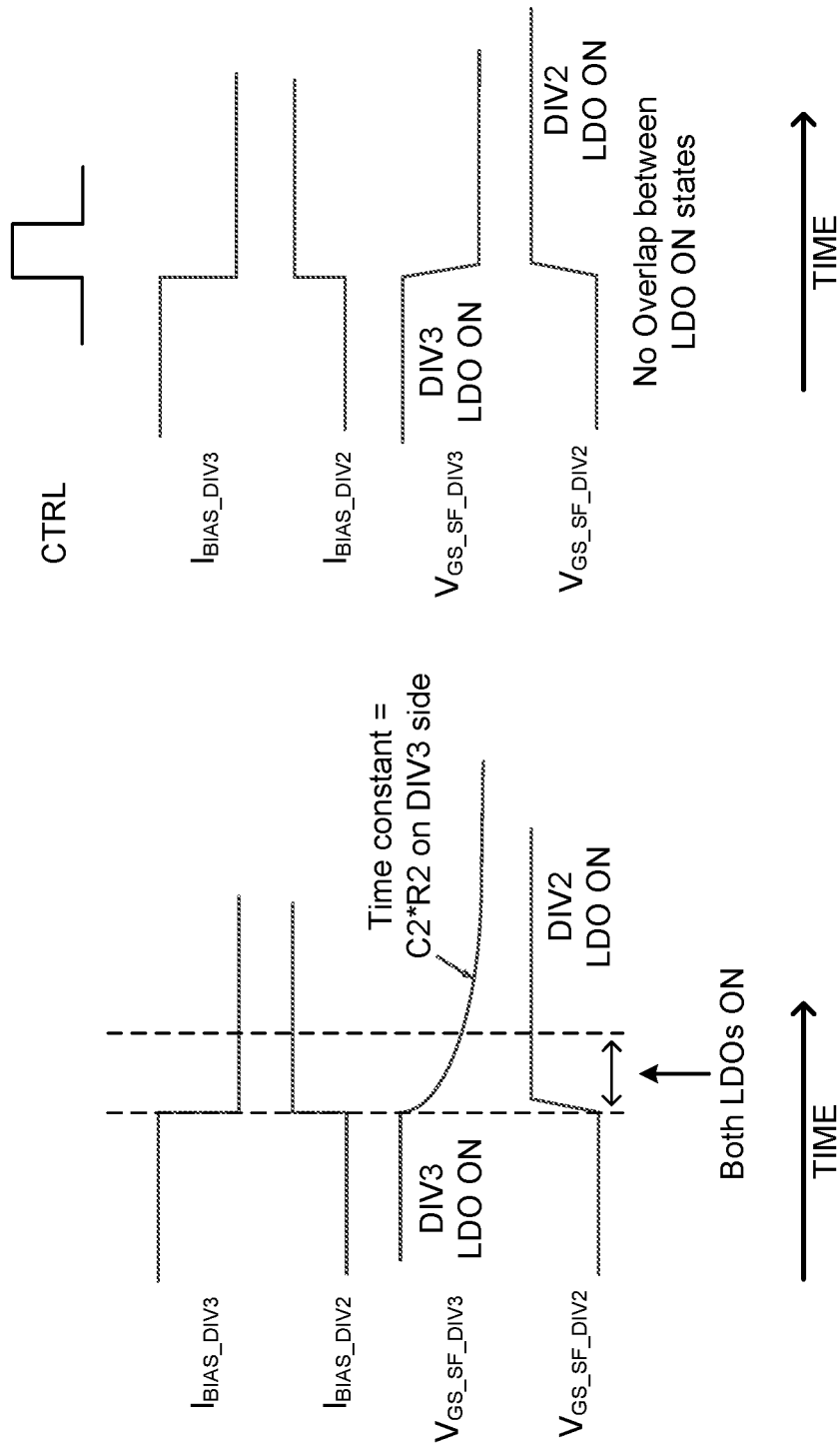

*900*

| Coupling a first low-dropout circuit between a first voltage source and the voltage input node of the target circuit, the first low-dropout circuit including a first FET circuit configured to selectively apply a first voltage to the voltage input node of the target circuit | — 902 |

| Coupling a second low-dropout circuit between a second voltage source and the voltage input node of the target circuit, the second low-dropout circuit including a second FET circuit configured to selectively apply a second voltage to the voltage input node of the target circuit | — 904 |

FIG. 9

REDUCED GATE DRIVE FOR POWER CONVERTER WITH DYNAMICALLY SWITCHING RATIO

CROSS-REFERENCE TO RELATED APPLICATIONS

This invention may be related to the U.S. patent application Ser. No. 17/331,594, filed May 26, 2021, entitled "Dynamic Division Ratio Charge Pump Switching", assigned to the assignee of the present invention, the contents of which are incorporated by reference.

BACKGROUND

(1) Technical Field

This invention relates to electronic circuits, and more particularly to power converter circuits, including DC-DC converter circuits, and current limiting circuits for such converter circuits.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-2V). Still other circuitry may require an intermediate voltage level (e.g., 5-10V).

Power converters are often used to generate a lower or higher voltage from a common power source, such as a battery. One type of power converter comprises a converter circuit (e.g., a charge pump based on a switch-capacitor network), control circuitry, and, in some embodiments, auxiliary circuitry such as bias voltage generator(s), a clock generator, a voltage regulator, a voltage control circuit, etc. As used in this disclosure, the term "charge pump" refers to a switched-capacitor network configured to boost or buck $V_{IN}$ to $V_{OUT}$. Examples of such charge pumps include cascade multiplier, Dickson, Ladder, Series-Parallel, Fibonacci, and Doubler switched-capacitor networks, all of which may be configured as a multi-phase or a single-phase network. Switched-capacitor network DC-DC converters are generally integrated circuits (ICs) that may have some external components (such as capacitors) and in most cases are characterized as having a fixed $V_{IN}$ to $V_{OUT}$ conversion ratio (e.g., division by 2 or by 3). As is known in the art, an AC-DC power converter can be built up from a DC-DC power converter by, for example, first rectifying an AC input to a DC voltage and then applying the DC voltage to a DC-DC power converter.

To provide greater flexibility to system designers, and to deal with applications where a power source may change that requires different conversion ratios (e.g., as a battery discharges and outputs a lower voltage, or when the power source to a device is switched between a battery and an AC-DC power line source), it is useful to utilize a DC-DC power converter having a selectable conversion ratio. For example, U.S. Pat. No. 10,263,514 B1, issued Apr. 16, 2019, entitled "Selectable Conversion Ratio DC-DC Converter", assigned to the assignee of the present invention and hereby incorporated by this reference, describes a Dickson DC-DC power converter that may be switched between a divide-by-2 (DIV2) mode of operation and a divide-by-3 (DIV3) mode of operation. As another example, U.S. Pat. No. 9,203,299 B2, issued Dec. 1, 2015, entitled "Controller-Driven Reconfiguration of Switched-Capacitor Power Converter", now assigned to the assignee of the present invention and hereby incorporated by this reference, describes other DC-DC power converter architectures having reconfigurable conversion ratios.

A general problem with many FET-based DC-DC power converter architectures is that excessive current in-rush needs to be avoided during startup of the power converter. For example, for a selectable conversion ratio DC-DC converter of the type shown in U.S. Pat. No. 10,263,514 B1, absent sufficient guard circuitry, when an input voltage $V_{IN}$ is first applied, none of the capacitors (sometimes known as "fly capacitors") would be charged initially and accordingly current rushes into the circuit. For instance, if the ON resistance, $R_{ON}$, of the FET power switches is 1 milliohm (0.001 ohms), and $V_{IN}$ is 10V, then as a result of Ohm's law, $V=I \times R$, the in-rush current will be a spike of about 10,000 amps. In integrated circuit implementations, parasitic inductances exist (for example, due to on-die conductor routing and printed circuit board conductor routing) which transform a current spike to a voltage spike in accordance with inductor theory: $V=L \times dI/dt$. Such voltage spikes electrically overstress the charge pump power switches, affecting their reliability, potentially to destruction. For a 1 ns 100 A pulse to generate 10V across the charge pump power switches, the parasitic inductance need only be about 100 pH. The resulting 10V spike may exceed the breakdown voltage of many of the FET switches, and of course, a larger current spike results in a larger voltage spike for the same parasitic inductance.

A related problem occurs when the fly capacitors of a DC-DC power converter are out of balance, meaning that a charge difference exists between fly capacitors connected by power switches. If charge balance is not maintained, current spikes and resulting damaging voltage spikes can occur.

A further design challenge is attaining high efficiency, especially important for devices (e.g., cell phones, "smart" watches, and fitness wearables), having constrained battery space.

Accordingly, it would be useful to be able to mitigate or eliminate what may be characterized as "potentially damaging events" in power converters (e.g., damaging current spikes that may occur for a variety of reasons, including in-rush current, charge transfer current, short circuits, EMI events, and the like) while achieving high efficiency.

SUMMARY

The present invention provides circuits and methods for selectable conversion ratio power converters that include low-dropout (LDO) power supplies adapted to select voltage inputs based on the selected conversion ratio while achieving high efficiency. The LDO power supplies limit current through power FETs of power converters, thereby mitigating or eliminating potentially damaging events. Such circuits and methods provide protection against potentially damaging events such as current spikes during a "soft-start" for power converters and during dynamic charge balancing, without requiring added circuitry directed to those functions.

The present invention recognizes that basing the gate voltage to all of the non-top level power switches of a power converter on $V_{IN}$ or a similar voltage level is inefficient, since those supply voltages are higher than needed to switch the lower-level power FETs. Accordingly, one aspect of the present invention is the utilization of internal voltage nodes of the power converter itself to efficiently power the gates of the lower-level power switches. A complicating factor in using such internal voltage nodes is that the division ratio of the power converter may be dynamically switched, which affects the voltage available at some of the utilized internal voltage nodes because of the change of switching phases for some power FETs (e.g., power switch S2). Further, during transitions between DIV2 and DIV3 operation, an incorrect LDO configuration can cause cascading effects that can damage the power converter. Accordingly, another aspect of the present invention is an adaptive circuit architecture that functionally allows dynamic switching between different voltage supply sources for the LDOs powering associated level shifters and pre-drivers and for the LDOs powering the associated final drivers.

In one embodiment, the invention encompasses a dual low-dropout circuit configuration including: a first low-dropout circuit including a FET circuit configured to be coupled between a first voltage source and a target circuit, the first low-dropout circuit configured to selectively apply a first voltage to a voltage input node of the target circuit; and a second low-dropout circuit including a FET circuit configured to be coupled between a second voltage source and the target circuit, the second low-dropout circuit configured to selectively apply a second voltage to the voltage input node of the target circuit.

In some embodiments, the first and second low-dropout circuits are full gate-drive LDOs having "wired-OR" outputs which may, for example, provide power to a target circuit such as a pre-driver (and optionally, a level-shifter) coupled to the gate of a power FET. In some embodiments, the first and second low-dropout circuits are reduced gate-drive LDOs having "wired-OR" outputs that may, for example, provide power to a final driver coupled to the gate of a power FET. Some embodiments, dual full gate-drive LDOs having "wired-OR" outputs provide power to a target circuit such as a pre-driver (and optionally, a level-shifter) coupled to the gate of a power FET, while dual reduced gate-drive LDOs having "wired-OR" outputs provide power to a final driver coupled to the gate of the power FET.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 7B is a set of graphs of current and voltage as a function of time for a dual reduced gate-drive LDO depicting the issue of ON-time overlap.

FIG. 7C is a set of graphs of current and voltage as a function of time for a dual reduced gate-drive LDO that includes the fast-discharge switch $M_{FD}$ of FIG. 7A.

FIG. 9 is a process flow chart showing a method of providing power to a voltage input node of a target circuit.

Like reference numbers and designations in the various drawings indicate like elements.

DETAILED DESCRIPTION

The present invention provides circuits and methods for selectable conversion ratio power converters that include low-dropout (LDO) power supplies adapted to select voltage inputs based on the selected conversion ratio while achieving high efficiency. The LDO power supplies limit current through power FETs of power converters, thereby mitigating or eliminating potentially damaging events. Such circuits and methods provide protection against potentially damaging events such as current spikes during a "soft-start" for power converters and during dynamic charge balancing, without requiring added circuitry directed to those functions.

Example Selectable Conversion Ratio Power Converter

Figure 1:
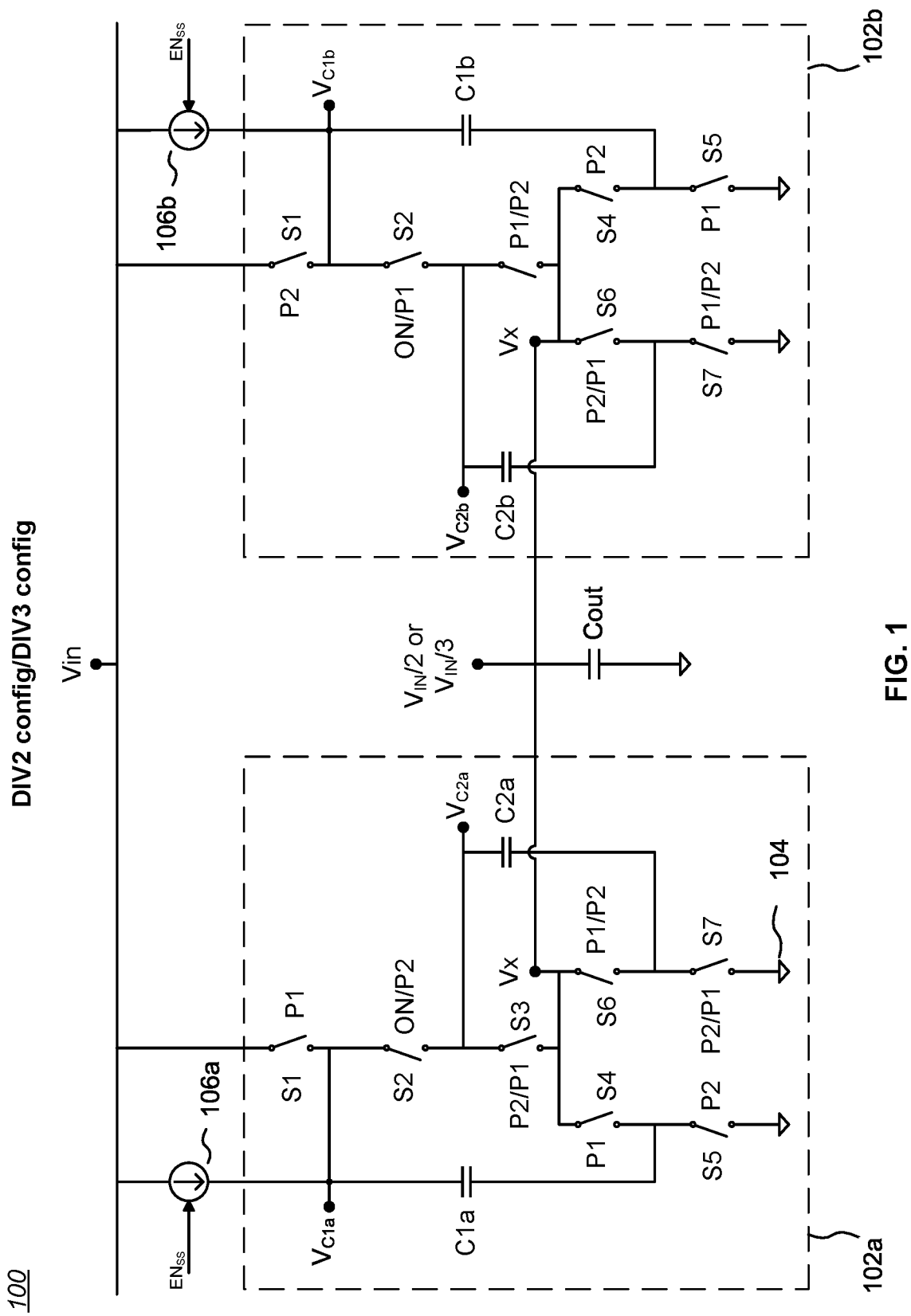
FIG. 1 is a block diagram of one embodiment of a DC-DC selectable conversion ratio power converter.

FIG. 1 is a block diagram of one embodiment of a DC-DC selectable conversion ratio power converter 100. The specific illustrated power converter 100 may be selectably configured to be either a divide-by-2 (DIV2) Dickson converter or a divide-by-3 (DIV3) Dickson converter using the same basic circuit. The same power converter 100 may be used in general for DC-to-DC boost conversion by reversing the voltage input and voltage output, possibly with some relatively minor design changes. The illustrated power converter 100 includes two parallel sections 102a, 102b that are coupled between a voltage source $V_{IN}$ and a reference potential 104 such as circuit ground. Each section 102a, 102b includes 3 series-connected switches S1-S3 coupled in series to a first branch comprising 2 series-connected switches S4-S5, and to a second branch comprising 2 series-connected switches S6-S7. Each switch may comprise, for example, one or more FETs, including one or more MOSFETs.

In each section 102a, 102b, coupled between a first upper pair of switches S1, S2 and a first branch pair of switches S4, S5 is a first capacitor C1a, C1b, and coupled between a second upper pair of switches S2, S3 and a second branch pair of switches S6, S7 is a second capacitor C2a, C2b. The first capacitors C1a, C1b, when charged, have a voltage of $V_{IN}/2$ across them at respective nodes $V_{C1a}$ and $V_{C1b}$. The second capacitors C2a, C2b, when charged, have a voltage of either $V_{IN}/2$ (DIV/2) or $V_{IN}/3$ (DIV/3) across them at respective nodes $V_{C2a}$ and $V_{C2b}$. Depending on the output ratio configuration (divide-by-2 or divide-by-3), each section 102a, 102b may generate an output voltage at a node $V_X$ that is coupled to an output capacitor $C_{OUT}$.

At least some of the switches S1-S7 may be selectively controlled to be in an ON (conductive) or OFF (blocking) state by control circuitry (not shown). At least some of the switches S1-S7 may be selectively coupled to one of two non-overlapping complementary clock phases, P1 or P2. Some of the switches S1-S7 may be permanently coupled to one of the two complementary clock phases, P1 or P2. TABLE 1 below shows the configuration of the state or associated clock phase for each of the switches S1-S7 of the two parallel sections 102a, 102b for both a divide-by-2 configuration and a divide-by-3 configuration.

TABLE 1

| Divide-by-2 Configuration | | Divide-by-3 Configuration | |
|---|---|---|---|
| Section 102a | Section 102b | Section 102a | Section 102b |
| S1 = P1 | S1 = P2 | S1 = P1 | S1 = P2 |
| S2 = ON | S2 = ON | S2 = P2 | S2 = P1 |
| S3 = P2 | S3 = P1 | S3 = P1 | S3 = P2 |
| S4 = P1 | S4 = P2 | S4 = P1 | S4 = P2 |
| S5 = P2 | S5 = P1 | S5 = P2 | S5 = P1 |
| S6 = P1 | S6 = P2 | S6 = P2 | S6 = P1 |
| S7 = P2 | S7 = P1 | S7 = P1 | S7 = P2 |

Note that the clock phase associations for section 102b are the complements of the clock phase associations for section 102a. The complementary phasing of the two parallel sections 102a, 102b provides output ripple smoothing, more constant output drive current, and additional current capacity. Additional sections may be included to provide even more current capacity. Complimentary pairs of additional sections may be controlled by clock signal phases that are 180° apart and that have a different phase than P1 or P2 to provide even more output ripple smoothing (e.g., 45° or 60°—or multiples of those values—out of phase with respect to P1 and P2).

Figure 2:
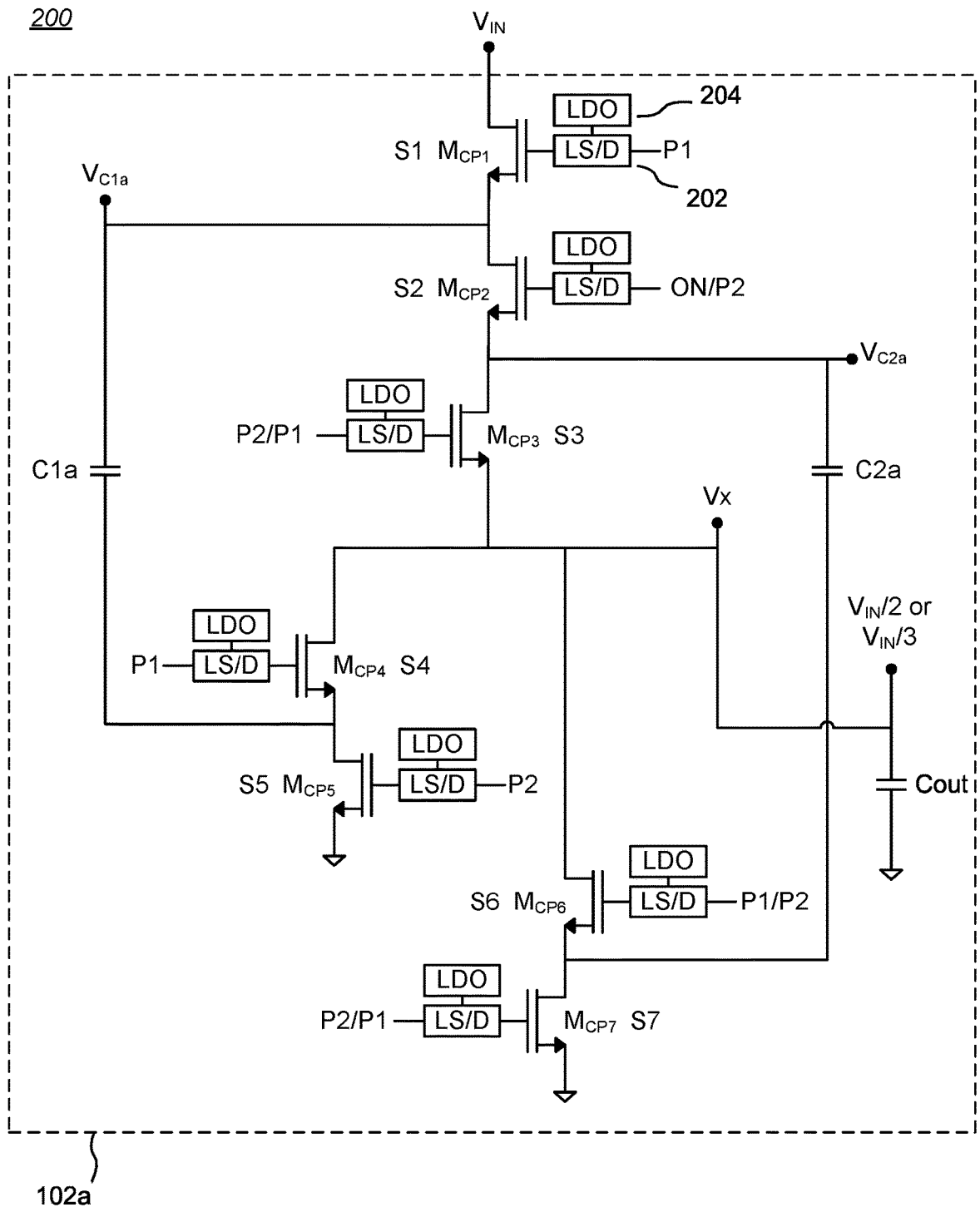
FIG. 2 is a block diagram of one section of a power converter showing details for a FET implementation of the power switches of that section.

In a FET-based implementation, ON/OFF control signals or clock phase signals are coupled to the gate of each switch S1-S7 through at least a driver circuit, and in many cases through both a level shifter circuit and a driver circuit (see FIG. 2 for more details).

In either configuration, the non-overlapping complementary clock signals P1, P2 open or close associated power switches, causing charge to be transferred from the fly capacitors C1a, C1b, C2a, C2b into $C_{OUT}$, resulting in a voltage across $C_{OUT}$ of $V_{IN}/X$, where X=2 or 3. Further details of the operation of this and similar DC-DC selectable conversion ratio power converters are set forth in U.S. Pat. No. 10,263,514 B1.

Limiting In-Rush Current During Soft-Starts

As noted above, damaging current spikes in power converters may occur for a variety of reasons, including in-rush current, charge transfer current, short circuits, and the like. For example, with respect to DC-DC power converters having selectable conversion ratios, switching from one conversion ratio (e.g., DIV2) to another conversion ratio (e.g., DIV3) may result in a charge imbalance across the fly capacitors, resulting in potentially damaging in-rush currents. Accordingly, a common practice for avoiding potentially damaging events has been to switch the DC-DC power converter OFF, allow the fly capacitors to discharge, change the conversion ratio configuration (e.g., by changing clock phasing to the switches S1-S7 as needed), and turn the power back ON, relying on conventional startup circuitry to mitigate in-rush current spikes. A disadvantage of this practice is that the process can take several milliseconds to complete and cannot be completed under load.

One aspect of the present invention encompasses circuits and method for mitigating or eliminating potentially damaging events if they occur or are to occur (e.g., are known in advance, as when a conversion ratio is to be dynamically changed). Mitigating or eliminating potentially damaging events enables switching selectable conversion ratios DC-DC power converters from one conversion ratio to another conversion ratio under load without turning off the power converter circuitry or suspending switching of the charge pump power switches.

As described in U.S. patent application Ser. No. 17/331,594, it is desirable, and often necessary, to limit the current drawn by a power converter from an input supply during startup to avoid high in-rush currents, particularly when dynamically changing the conversion ratio of the power converter. Referring to FIG. 1, a conceptual solution during a "soft-start" period before steady-state operation of the power converter 100 is to enable current sources 106a, 106b, respectively coupled to the sections 102a, 102b, and operate the switches S2-S7 so as to allow the fly capacitors C1a, C1b, C2a, C2b to be charged by the current sources 106a, 106b to a sufficient state to prevent current spikes. More specifically, the current sources 106a, 106b may be coupled between $V_{IN}$ and a node between switches S1 and S2 that also couples to a respective fly capacitor C1a, C1b. Closing switch S2 during the soft-start period also couples the current sources 106a, 106b to a respective fly capacitor C2a, C2b; switch S1 is OPEN during the soft-start period when using the current sources 106a, 106b to limit current flow, and in essence all other switches run as normal. Hence, the power converter 100 is running as a charge pump but with limited current flow.

One way to implement the current sources 106a, 106b is by means of a power switch coupled in series with a resistor between $V_{IN}$ and the node between switches S1 and S2 (the power switch and resistor are thus coupled in parallel with switch S1). Closing the power switch creates a high resistive path during the soft-start period to limit the start-up current. Once the power converter output voltage $V_{OUT}$ nears its regulated value, the power switch is opened. However, such an implementation requires a very large FET for the power switch in order to withstand the voltage and current at startup, and thus requires a large amount of integrated circuit (IC) die area (as much as about 25% in some embodiments).

In U.S. patent application Ser. No. 17/331,594, it was realized that switch S1 and its driver circuitry could be adapted to perform the functions of the current sources 106a, 106b, thus eliminating the need for additional large power switches and resistors. In particular, it was realized that the power converter switches S1-S7 are normally operated in an "over-driven" or "full drive" condition when set to an ON (conducting) state. An overdriven FET gate creates a stronger conduction channel, effectively lowering the ON resistance, $R_{ON}$, of the FET. With that insight, it was further realized that increasing $R_{ON}$ for some or all of the power FETs in a power converter (especially switch S1) during potentially damaging events (e.g., during startup or when dynamically reconfiguring the conversion ratio of the power converter) reduces current flow through the FETs and thus protects against excessive current spikes.

FIG. 2 is a block diagram of one section 102a of a power converter 200 showing details for a FET implementation of the power switches S1-S7 of that section. While section 102a is shown, a similar configuration exists for section 102b. In the illustrated example, power switches S1-S7 are implemented as FETs $M_{CP1}$-$M_{CP7}$ (generically, "$M_{CPx}$"). The gate of each FET $M_{CPx}$ is coupled to a level-shifter/driver block 202 (not all instances are numbered to avoid clutter). In some cases (e.g., power switches S6 and S7), the level-shifter/driver block 202 may include only a driver, as level shifting may not be needed, depending upon the $V_{IN}$ and $V_{OUT}$ voltages. A level shifter translates an input signal from one voltage domain (e.g., digital logic voltages) to another voltage domain (e.g., transistor control voltages). The output of the level shifter thus follows the input signal but in a different voltage range. Power to each level-shifter/driver block 202 is provided by a corresponding LDO block 204. A clock phase (P1 or P2 in this example) or an ON/OFF control signal may be coupled through a level-shifter/driver block 202 to the gate of the corresponding power FET $M_{CPx}$.

As described in U.S. patent application Ser. No. 17/331,594, referenced above, at least some of the LDO blocks 204 can selectively increase $R_{ON}$ for an associated power FET in a power converter by actively controlling the driver voltage to the gate of the power FET. During normal power converter operation, the power FET driver voltage may be set to overdrive the FET gate to lower $R_{ON}$ to a desired level that allows high current flow for a particular application. However, for other scenarios (e.g., during soft-startup, charge balancing, or conversion ratio mode changes), the power FET driver voltage may be reduced so as to increase $R_{ON}$ and thus impede current flow through the power FET to a desired level.

LDO Power Supply Embodiment with Reduced Gate-Drive Capability

Figure 3A:
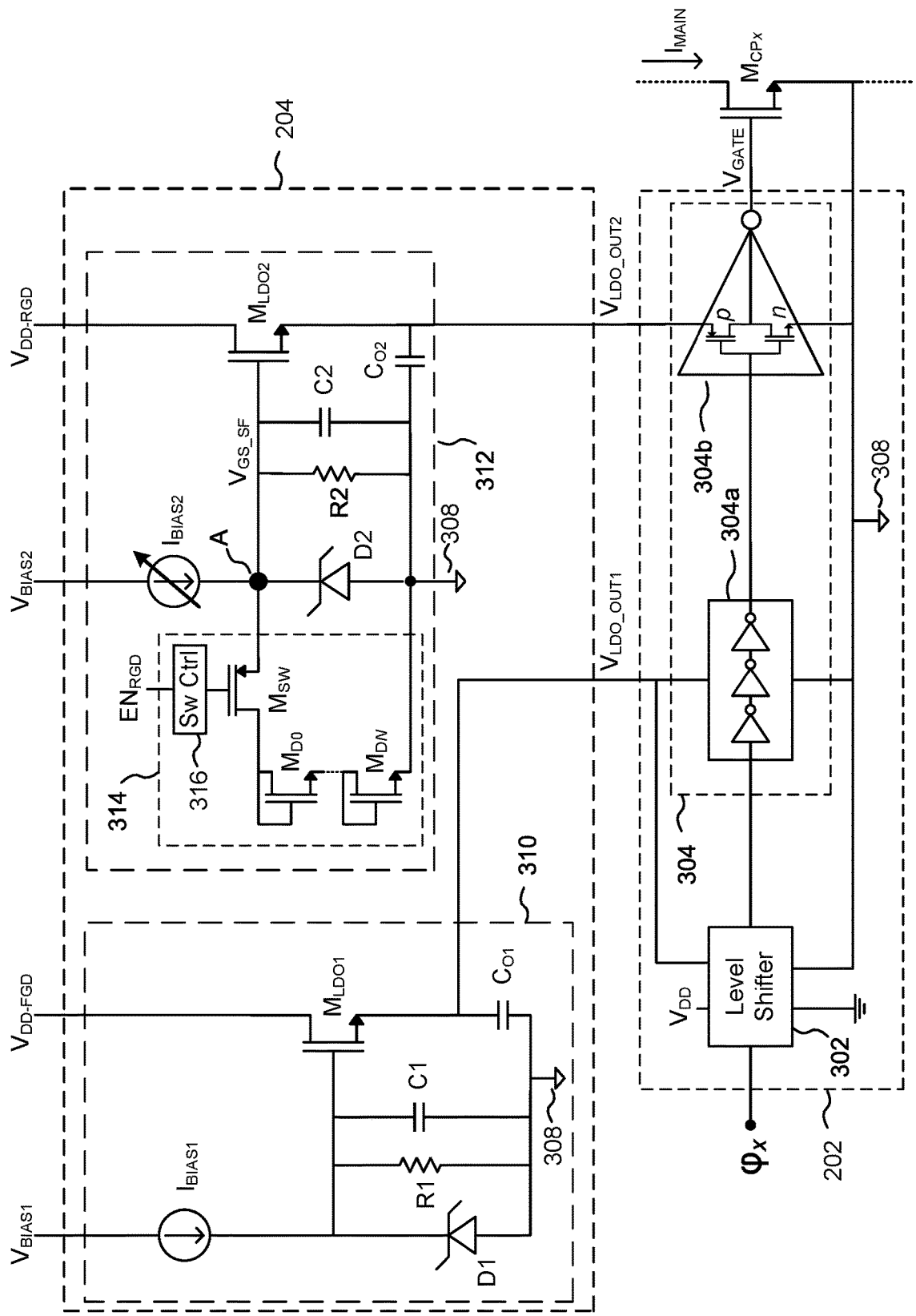
FIG. 3A is a schematic diagram of one embodiment of the level-shifter/driver block and the LDO block of FIG. 2.

FIG. 3A is a schematic diagram of one embodiment of the level-shifter/driver block 202 and the LDO block 204 of FIG. 2. As in FIG. 2, the LDO block 204 provides power to a level-shifter/driver block 202 coupled to the gate of an associated power FET $M_{CPx}$. The input to the level-shifter/driver block 202, $\varphi_x$ (e.g., either clock signal P1 or clock signal P2, or an ON or OFF control signal), is applied to the input of a level shifter 302. The output of the level shifter 302 is coupled to the input of a driver circuit 304, the output of which is coupled to the gate of the associated FET $M_{CPx}$. In the illustrated example, the driver circuit 304 includes a pre-driver 304a (comprising a set of three series-coupled inverters in this example) and a series-coupled final driver 304b. Internally, the final driver 304b has at least one NMOS FET n and one PMOS FET p with coupled conduction channels, drain-to-drain, with each FET n, p having a gate driven by the output of the pre-driver 304a. The drains of PMOS FET p and of NMOS FET n are coupled to the gate of the associated power FET $M_{CPx}$. Note that for some embodiments, the level shifter 302 may be interposed after the pre-driver 304a, or between a pair of the inverters comprising the pre-driver 304a.

In some embodiments, the inverters may increase in physical size from inverter to inverter in order to provide sufficient current drive capability to charge or discharge the gate of FET $M_{CPx}$. For example, in a driver circuit 304 having three series-coupled inverters in the pre-driver 304a, the first inverter may have a relative size of "1", the second inverter may be 3 times larger than the first inverter, and the third inverter may be 9 times larger than the first inverter. Lastly, the final driver 304b may be 27 times larger than the first inverter in the pre-driver 304a. The multipliers for the stages may differ from the 1×, 3×, 9×, and 27× ratios, although generally each stage is larger than the previous one to avoid having very slow rising and falling edges. In alternative embodiments, the number of inverter stages may be fewer or greater, and non-inverting stages (buffer amplifiers) may be used rather than inverting stages. Accordingly, the illustrated driver circuit 304 is exemplary only, and other circuits may be used to couple the output of the level shifter 302 to the gate of the associated FET $M_{CPx}$.

Power to the level shifter 302 and the driver circuit 304 is provided by the LDO block 204. In the illustrated example, the power source for the level shifter 302 and the pre-driver 304a is provided by a first LDO section 310. The first LDO section 310 comprises a source follower (common drain) FET $M_{LDO1}$ coupled between a capacitor $C_{O1}$ and a supply voltage $V_{DD\text{-}FGD}$. The capacitor $C_{O1}$ is also coupled to a floating reference potential 308. The source of the FET $M_{LDO1}$ provides a drive voltage $V_{LDO\_OUT1}$ to the level shifter 302 and the pre-driver 304a.

A current source $I_{BIAS1}$ is coupled in series with a Zener diode D1 between a supply voltage $V_{BIAS1}$ and the reference potential 308. A current source may be configured from transistors and/or diodes using a variety of circuits, as well as a pull-up resistor. One terminal of the Zener diode D1 is coupled to the gate of FET $M_{LDO1}$. A resistor R1 and a capacitor C1 are coupled in parallel with the Zener diode D1. The resistor R1 serves to discharge the gate of FET $M_{LDO1}$ when transitioning $M_{LDO1}$ from an ON state to an OFF state. Since the output of the LDO block 204 drives a switching circuit, there is potential for noise to be coupled to the gate of $M_{LDO1}$ which may modulate the output drive voltage $V_{LDO\_OUT1}$. Such noise is mitigated by capacitor C1. Alternative embodiments may use a push-pull drive to the gate of $M_{LDO1}$.

The output of the current source $V_{BIAS1}$ before the Zener diode D1 provides an essentially constant bias voltage to the gate of FET $M_{LDO1}$. The bias current $I_{BIAS1}$ flows through the Zener diode D1 and ensures that the diode is always in reverse bias. Unlike a conventional diode that blocks any flow of current through itself when reverse biased, as soon as the reverse voltage reaches a pre-determined value, a Zener diode begins to conduct. This applied reverse voltage remains almost constant even with large changes in current (so long as the current remains between a breakdown minimum current and a maximum current rating for the Zener diode). A Zener diode continues to regulate its voltage until the holding current of the diode falls below the minimum current value in the reverse breakdown region.

The final driver 304b is powered by a second LDO section 312 that includes a FET $M_{LDO2}$ having its conduction channel (between drain and source) coupled between a supply voltage $V_{DD\text{-}RGD}$ and the final driver 304b. The gate of FET $M_{LDO2}$ is coupled to a separate gate driver circuit that is independent of the gate driving circuitry for FET $M_{LDO1}$. A principal function of the gate driver circuit of the second LDO section 312 is to enable at least two different voltage levels at Node A to be coupled to the gate of FET $M_{LDO2}$, which in turn determines the output voltage level $V_{GATE}$ provided by the final driver 304b driving the associated power FET $M_{CPx}$. The associated power FET $M_{CPx}$ thus can be placed into (1) an overdriven or "full gate-drive" ON state having low $R_{ON}$ for normal power converter operation, or (2) at least one current-limiting reduced gate-drive ON state having a higher $R_{ON}$ and/or being in a saturation mode whereby current is limited. Saturation mode looks like an increased $R_{ON}$ but is not quite the same—in saturation mode, the FET $M_{CPx}$ behaves like an ON-OFF switch that can only pass a maximum fixed current regardless of applied voltage, while a resistor implies that a greater voltage allows a greater current. The current-limiting state is selected to provide protection against potentially damaging events (e.g., in-rush or charge transfer current). Potentially damaging events may occur during dynamic re-configuration of the conversion ratio of the power converter, during power converter startup, when balancing charge among fly capacitors within the power converter, or during fault events such as short circuit events.

A resistor R2 and a capacitor C2 are coupled in parallel with the Zener diode D2 and function in essentially the same manner as resistor R1 and capacitor C1. A reservoir capacitor $C_{O2}$ is coupled between the source of FET $M_{LDO2}$ and the floating reference potential 308, and provides some initial charge to the gate of the FET $M_{CPx}$ as well as isolation from the floating reference potential 308.

The gate driver circuit for FET $M_{LDO2}$ includes a variable current source $I_{BIAS2}$ coupled in series with a Zener diode D2 between a supply voltage $V_{BIAS2}$ and the reference potential 308. The gate of FET $M_{LDO2}$ is coupled to Node A between the current source $I_{BIAS2}$ and the Zener diode D2. The output of the current source $I_{BIAS2}$ before the Zener diode D2 at Node A provides an essentially constant bias voltage $V_{GS\_SF}$ to the gate of FET $M_{LDO2}$. The source of FET $M_{LDO2}$ provides a drive voltage $V_{LDO\_OUT2}$ to the final driver 304b.

In parallel with the Zener diode D2 is a voltage control circuit 314 comprising a reduced gated-drive P-type FET switch $M_{SW}$ series-coupled to a first diode-connected FET $M_{D0}$ and at least one additional diode-connected FET $M_{DN}$, where N≥1. The gate of FET switch $M_{SW}$ is coupled to a switch control block 316 that is coupled to an ENABLE signal $EN_{RGD}$; details of the switch control block 316 are discussed below.

The conduction channels of the first diode-connected FET $M_{D0}$ and the at least one additional diode-connected FET $M_{DN}$ are coupled in series. As illustrated, the conduction channel of the switch FET switch $M_{SW}$ is coupled between Node A and the conduction channel of the first diode-connected FET $M_{D0}$. The conduction channel of the last-in-series additional diode-connected FET $M_{DN}$ is coupled to the floating reference potential 308. Note that the switch FET switch $M_{SW}$ may be positioned anywhere along the voltage control circuit 314 to interrupt or enable current flow through that circuit. However, positioning the FET switch $M_{SW}$ as shown in FIG. 3 may reduce parasitic influences on FET $M_{LDO2}$ due, for example, to the capacitances of diode-connected FETs $M_{D0}$ and/or $M_{DN}$.

A function of the diode-connected FET $M_{D0}$ is to offset FET $M_{LDO2}$, since the threshold voltages of FET $M_{D0}$ and FET $M_{LDO2}$ effectively cancel. A function of the additional diode-connected FETs $M_{DN}$ is to set the current $I_{MAIN}$ through FET $M_{CPx}$ in proportion to the ratio of the sizes of FET $M_{CPx}$ to FET $M_{DN}$ when FET switch $M_{SW}$ is CLOSED and the current mirror function of the voltage control circuit 314 is engaged. More particularly, the current $I_{MAIN}$ through FET $M_{CPx}$ is proportional to the current from the current source $I_{BIAS2}$ and the size ratio of FET $M_{DN}$ to FET $M_{CPx}$. For example, if the current source $I_{BIAS2}$ output is 1 mA, and FET $M_{CPx}$ is 1,000 times the size of FET $M_{DN}$ (W/L $M_{CPx}$=1000×W/L $M_{DN}$), then the maximum current through FET $M_{CPx}$ will be 1,000×1 mA=1 A. This is achieved by ensuring the gate-to-source voltage $V_{GS}$ of FET $M_{DN}$ is the same as that of FET $M_{CPx}$. The maximum gate voltage of FET $M_{CPx}$ is the voltage at Node A minus the threshold voltage $V_{TH}$ of FET $M_{LDO2}$. Including FET $M_{D0}$ increases the voltage at Node A by a second threshold voltage $V_{GS}$, so the voltage at Node A=($V_{GS}$ of FET $M_{DN}$)+($V_{TH}$ of FET $M_{D0}$), or $2V_{GS}$. If FET $M_{LDO2}$ and FET $M_{D0}$ are matched (ratiometrically), then the maximum the $V_{GS}$ of FET $M_{CPx}$ can reach is the same as the $V_{GS}$ of FET $M_{DN}$, and this equality tracks over process, temperature, etc.

As noted, the diode-connected FET(s) $M_{DN}$ are ratioed in size with respect to FET $M_{CPx}$. In some embodiments, FETs $M_{LDO1}$, $M_{LDO2}$, $M_{D0}$, and $M_{CPx}$ may be segmented FETs, meaning that a device intended to function as a large FET is fabricated as multiple (e.g., 10,000) small FETs coupled in parallel (the individual small FETs may be called "fingers", reflecting typical aspects of their physical layout on an IC die). The diode-connected FET(s) $M_{D0}$, $M_{DN}$ may be fabricated using the same technology, but can be made with a much smaller number of FET fingers (e.g., as few as one finger). Because of the configuration of FET $M_{LDO2}$ and the final driver 304b, a small change in current flow through the voltage control circuit 314 affecting the voltage $V_{GS\_SF}$ at the gate of FET $M_{LDO2}$ causes a proportionally larger current flow $I_{MAIN}$ through power FET $M_{CPx}$ determined by the size ratio of FET $M_{CPx}$ to FET $M_{DN}$.

Adding more than one diode-connected FET $M_{DN}$ allows adjustment of the size ratio of FET $M_{CPx}$ to FET $M_{DN}$. For instance, if FET $M_{CPx}$ has a width of 100 and 1,000 fingers, a first FET $M_{DN}$ should also have a width of 100 to match, but may only have 1 finger. Hence the size ratio of FET $M_{DN}$ to FET $M_{CPx}$ is 1,000 to 1, and 1 mA from the current source $I_{BIAS2}$ means 1 A through FET $M_{CPx}$. To change the size ratio to 2,000 to 1, two diode-connected FETs $M_{DN}$ may be coupled in series (source to drain). If the FET width is still 100, the effective number of fingers of the two diode-connected FETs $M_{DN}$ is one-half, giving a size ratio of 2,000 to 1 with respect to FET $M_{CPx}$.

As noted above, an important function of the gate driver circuit is that it provides a selectable amount of regulated gate bias voltage $V_{GS\_SF}$ to FET $M_{LDO2}$, which in turn controls the power supply to, and voltage output of, the final driver 304b. When FET switch $M_{SW}$ is OPEN, then the voltage control circuit 314 is disconnected from Node A—and therefore from the gate of FET $M_{LDO2}$—and thus has essentially no effect on the output of FET $M_{LDO2}$; accordingly, the final driver 304b can fully overdrive the gate of FET $M_{CPx}$ to a selected level determined by the Zener diode D2.

When FET switch $M_{SW}$ is CLOSED—such as during startup of the power converter or when dynamically switching conversion ratios or rebalancing charge amount fly capacitors—then the voltage control circuit 314 operates as a bypass to divert current around diode D2 and lower the voltage at Node A, thus reducing the drive voltage to FET $M_{LDO2}$. The reduced gate-drive voltage to FET $M_{LDO2}$ in turn reduces the power to the final driver 304b and thus reduces the gate-drive voltage $V_{GATE}$ to the power FET $M_{CPx}$. Accordingly, FET $M_{CPx}$ receives a reduced gate-drive voltage that results in an increased $R_{ON}$ value and/or limited saturation current compared to the full overdriven state. That increased limitation of current flow through at least some of the power FETs $M_{CPx}$ of a power converter may inhibit excessive current spikes, thus protecting the power FETs (as well as other coupled circuitry) from large voltage spikes. Selectively varying the $I_{BIAS2}$ current controls the value of $V_{GATE}$ applied to the power FET $M_{CPx}$, thus enabling selection of different current flow limitations.

In some embodiments, reduced gate-drive operation of a power FET $M_{CPx}$ in the ON state to limit current spikes during potentially damaging events may be enabled (triggered) by a control circuit (not shown) as a function of a measured parameter, such as the value of $V_{IN}$, $V_{OUT}$, pump capacitor voltages, or load current, and/or as the result of sensed events, such as short circuit events and/or charge imbalances on the pump capacitors. In some embodiments, reduced gate-drive operation of a power FET $M_{CPx}$ in the ON state to limit current spikes during potentially damaging events may be enabled (triggered) based on an external ENABLE signal $EN_{GRD}$ for FET switch $M_{SW}$ that is asserted in advance of a known impending event, such as dynamic switching of conversion ratios.

The duration of reduced gate-drive operation for the power FETs may be set as a fixed time suitable for a particular application or may be determined based on some criteria. For example, reduced gate-drive operation for the power FETs may be a function of output load, or a function of output load and a selected maximum duration (i.e., a time-out parameter), or a function of the voltage across the fly capacitors having reached some percentage (e.g., 95%) of a desired target level, or some combination of these values and/or the values of other parameters.

An advantage of using diode-connected FETs in the voltage control circuit 314 fabricated using the same technology as the power FETs $M_{CPx}$ (e.g., NMOSFET) is that the devices should essentially have matching characteristics with respect to process/voltage/temperature (PVT) variations.

In summary, a principal function of the gate driver circuit for FET $M_{LDO2}$ is to enable at least two different voltage levels at Node A to be coupled to the gate of FET $M_{LDO2}$. More specifically, the voltage control circuit 314 can selectably shift the voltage at Node A between a first voltage level, in which the voltage control circuit 314 is not engaged (FET switch $M_{SW}$ is OPEN) and at least a second voltage level, in which the voltage control circuit 314 is engaged (FET switch $M_{SW}$ is CLOSED).

It should be appreciated that the second LDO section 312 illustrated in FIG. 3A is simple to implement, requiring little power and circuit area. However, other devices or circuits that provide the same or similar function may be used in other embodiments. For example, Node A could be coupled through FET switch $M_{SW}$ to an amplifier having a level-shifted reference voltage as an input.

Note that the LDO block 204 of FIG. 3A, including the second LDO section 312, may be used to power all of the FET switches in a power converter 100 to limit currents through such switches as may be needed (for example, when dynamically changing the conversion ratio of the power converter 100). In some instances, a level shifter 302 circuit may not be required for some FET switches (e.g., power switches S5 and S7 in FIG. 1), in which case $\varphi_x$ may be applied directly to the associated pre-driver 304a. In such a case, LDO section 310 may not be needed, and LDO section 312 may be used to drive the pre-drivers 304a, thus saving IC area. Note also that the LDO block 204 may be used to provide a regulated power supply to other types of target circuit, and not just to a level-shifter/driver block 202.

Figure 3B:
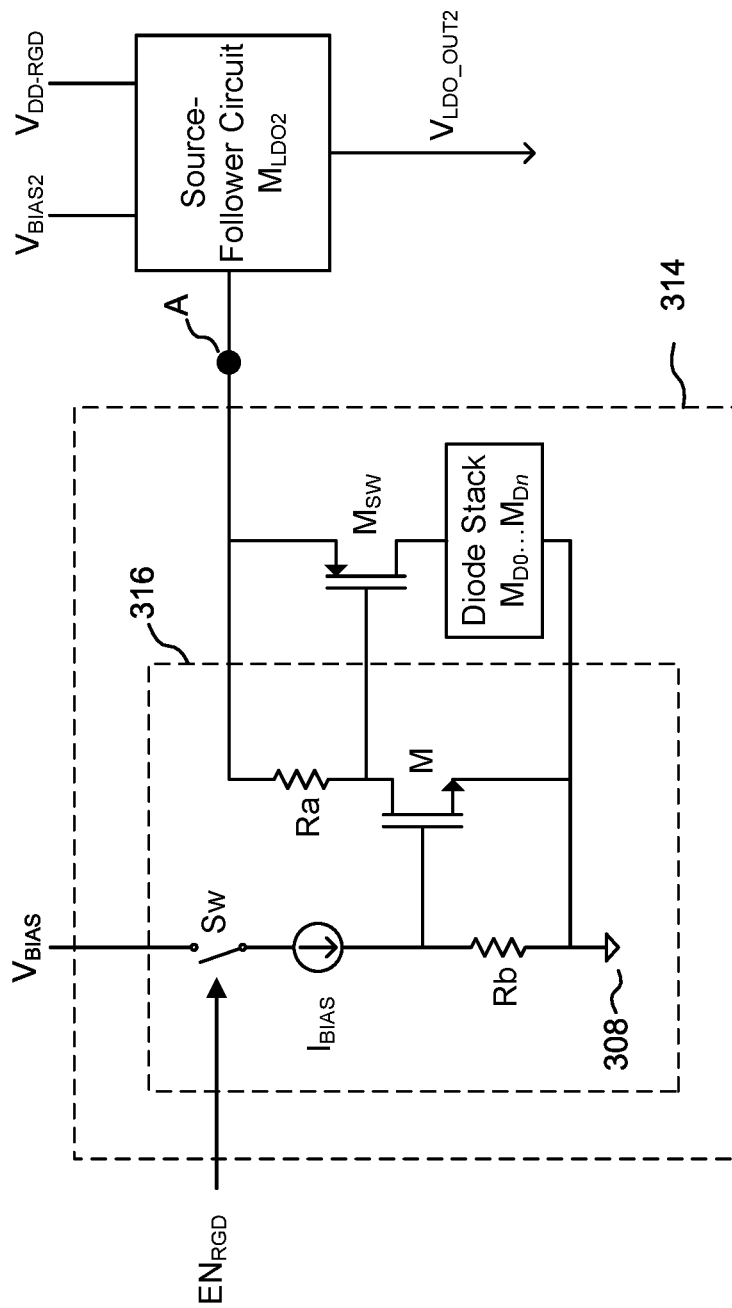
FIG. 3B is a block diagram showing details of one embodiment of a switch control block 316.

FIG. 3B is a block diagram showing details of one embodiment of a switch control block 316. The switch control block 316 is coupled to components of the voltage control circuit 314 as shown, and includes a NFET M having a first end of its conduction channel coupled by a resistor Ra to node A, and a second end of its conduction channel coupled to the floating reference potential 308. The drain of NFET M is coupled to the gate of the P-type FET switch $M_{SW}$. A switch Sw, a current source $I_{BIAS}$, and a resistor Rb are coupled in series as shown between a voltage $V_{BIAS}$ and the floating reference potential 308. The gate of NFET M is coupled between the current source $I_{BIAS}$ and the resistor Rb.

In an alternative embodiment, a standard level shifter may be used to drive the gate of FET switch $M_{SW}$, but possibly at the cost of larger IC area.

In operation, if the ENABLE signal $EN_{RGD}$ is a logical "1", then switch Sw closes, causing and NFET M to conduct and pull the gate of P-type FET switch $M_{SW}$ down to the floating reference potential 308. The result is an application of a negative $V_{GS}$ to the P-type FET switch $M_{SW}$, thus setting $M_{SW}$ to a conductive state (i.e., closing the switch). Conversely, if the ENABLE signal $EN_{RGD}$ is a logical "0", then switch Sw opens and NFET M does not conduct; accordingly, the $V_{GS}$ to the P-type FET switch $M_{SW}$ will be zero, thus setting $M_{SW}$ to a non-conductive state (i.e., opening the switch).

LDO Supply Voltages

The LDO block 204 for each power switch S1-S7 in FIG. 2 requires at least one voltage supply. In FIG. 3A, four voltage sources are shown, $V_{BIAS1}$, $V_{DD-FGD}$, $V_{BIAS2}$, and $V_{DD-RGD}$. In some embodiments, $V_{BIAS1}$ and $V_{BIAS2}$ may have the same value. In some embodiments, $V_{DD-FGD}$ and $V_{DD-RGD}$ may have the same value. In some embodiments, combination that $V_{BIAS1}$ and $V_{BIAS2}$, and $V_{DD-FGD}$ and $V_{DD-RGD}$ may have different values.

Each LDO block 204 should generate a voltage, $V_{GATE}$, sufficient to switch the associated power FET $M_{CPx}$. For a FET implementation of power switch S1, since the drain voltage to $M_{CP1}$ is $V_{IN}$, the corresponding gate voltage $V_{GATE}$ should equal or exceed $V_{IN}$ plus the $V_{GS}$ of the FET $M_{CP1}$. Accordingly, $V_{DD-FGD}$ and $V_{DD-RGD}$ for the LDO block 204 coupled to the level-shifter/driver block 202 for power FET $M_{CP1}$ should ultimately provide this value of $V_{GATE}$. The voltages $V_{DD-FGD}$ and $V_{DD-RGD}$ may be supplied by external circuitry coupled to each section 102a, 102b that provides a voltage $V_{BOOST1}$ that is greater than $V_{IN}$, such as 3V to 5V above $V_{IN}$. Each such external circuit may comprise, for example, a simple charge pump coupled to a boot capacitor. In the simplest implementation, the voltage supplies $V_{DD-FGD}$ and $V_{DD-RGD}$ for power switches S2-S7 may be $V_{BOOST1}$ or $V_{IN}$ (since such switches are at voltage levels less than $V_{IN}$).

Since $V_{DD-FGD}$ and $V_{DD-RGD}$ for power switch S1 are set to $V_{BOOST1}$, which is greater than $V_{IN}$, the gate voltages to the FETs $M_{LDO1}$-$M_{LDO2}$ should be greater than $V_{BOOST1}$ in order to properly switch ON. Accordingly, $V_{BIAS1}$ and $V_{BIAS2}$ may be provided by external circuitry coupled to each section 102a, 102b to provide a voltage $V_{BOOST2}$ that is greater than $V_{BOOST1}$, such as $V_{IN}$+5.5V. Each such external circuit may comprise, for example, a simple charge pump coupled to a boot capacitor. In the simplest implementation, the voltage supplies $V_{BIAS1}$ and $V_{BIAS2}$ for power switches S2-S7 may be $V_{BOOST2}$ or $V_{IN}$ (since such switches are at lower voltage levels).

Figure 4:
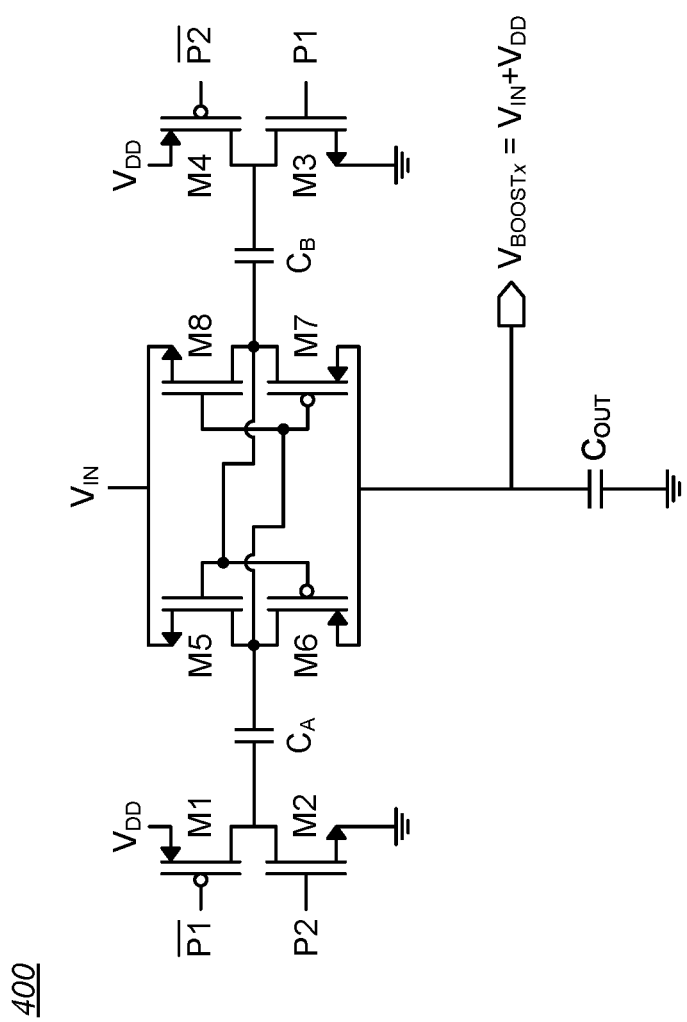
FIG. 4 is a schematic block diagram of one embodiment of a charge pump.

FIG. 4 is a schematic block diagram of one embodiment of a charge pump 400. Separate instance of the charge pump 400 may be used to generate $V_{BOOST1}$ and $V_{BOOST2}$ (generically, "$V_{BOOSTx}$"). The clock signals P1 and P2 are complementary and non-overlapping phases, while the /P1 and /P2 clock signals are inverted versions of P1 and P2. PFET M1 and NFET M3 conduct and block charge flow at the same times, while NFET M2 and PFET M4 conduct and block charge flow at the same times (but complementary to PFET M1 and NFET M3). FETs M1 and M2 and FETs M4 and M3 are respectively coupled in series between a voltage source $V_{DD}$ and a relative circuit ground. A cross-coupled set of FET pairs (NFET M5 and PFET M6 on the left, NFET M8 and PFET M7 on the right) is coupled between $V_{IN}$ and a capacitor $C_{OUT}$, which in turn is coupled to the relative circuit ground. Toggling of the P1 and P2 clocks signals (and their complementary versions) periodically connects $V_{IN}$ through FETs M5 and M8 to the "top" plates of capacitors $C_A$ and $C_B$, thus charging those capacitors to $V_{IN}$, and then periodically connects $V_{DD}$ through FETs M1 and M4 to the "bottom" plates of capacitors $C_A$ and $C_B$, thus adding $V_{DD}$ on the fly to $V_{IN}$. In greater detail, in a first phase, capacitor $C_A$ is charged to $V_{IN}$ through switches M5 and M2 in closed (ON) states, or capacitor $C_B$ is charged to $V_{IN}$ through switches M8 and M3 in closed states. In a second phase, capacitor $C_A$ is discharged to the output with a voltage of $V_{BOOSTx} = V_{IN} + V_{DD}$ through switches M1 and M6 in closed states, or capacitor $C_B$ is discharged to the output with a voltage of $V_{BOOSTx} = V_{IN} + V_{DD}$ through switches M4 and M7 in closed states.

Referring back to FIG. 2, it should be appreciated that the different power switches S1-S7 are subjected to different voltage ranges, and that only power switch S1 needs to withstand $V_{IN}$ when in an OFF state. The remaining power switches S2-S7 can be designed to withstand lower voltage levels. The present invention recognizes that basing the $V_{GATE}$ voltage to all of the lower-level power switches S2-S7 on $V_{BOOST1}$ or $V_{IN}$ is inefficient, since those supply voltages are higher than needed to switch the lower-level power FETs. Accordingly, one aspect of the present invention is the utilization of internal voltage nodes of the power converter itself to supply $V_{DD-FGD}$ and $V_{DD-RGD}$ in order to efficiently power the lower-level power switches S2-S7. A complicating factor in using such internal voltage nodes is that the division ratio of the power converter may be dynamically switched, which affects the voltage available at some of the utilized internal voltage nodes because of the change of switching phases for some power FETs (e.g., power switch S2). Further, during transitions between DIV2 and DIV3 operation, an incorrect LDO configuration can cause cascading effects that can damage the power converter. Accordingly, another aspect of the present invention is an adaptive circuit architecture that functionally allows dynamic switching between different voltage supply sources for the LDOs powering the level shifters 302 and pre-drivers 304a and for the LDOs powering the final drivers 304b.

Source-Switching LDOs

Figure 5A:
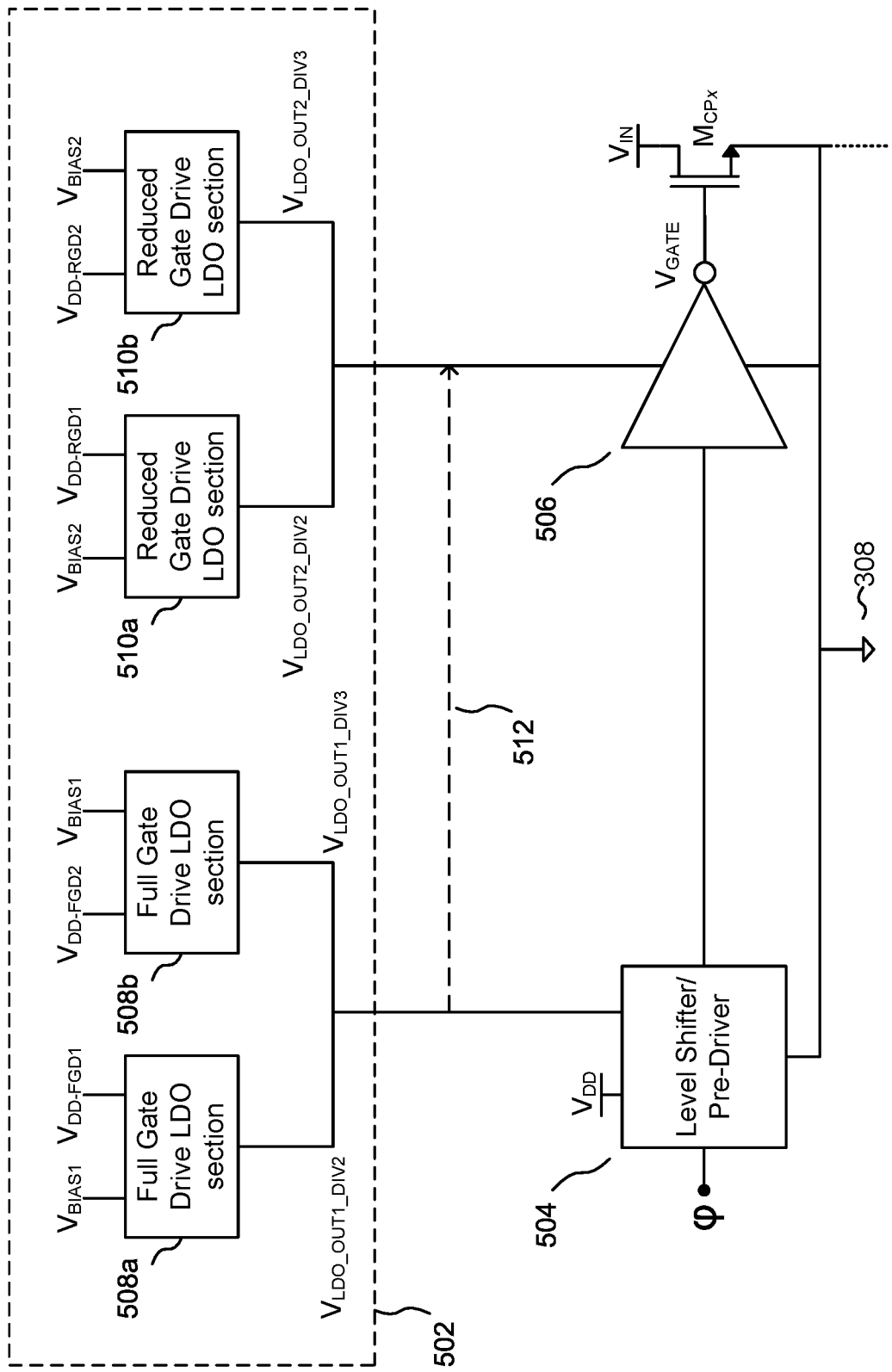
FIG. 5A is a block diagram of one embodiment of a "source switching" LDO configured to provide regulated power to a level shifter/pre-driver (comparable to the level shifter and pre-driver of FIG. 3A) and a final driver (comparable to the final driver of FIG. 3A).

FIG. 5A is a block diagram of one embodiment of a "source switching" LDO 502 configured to provide regulated power to a level shifter/pre-driver 504 (comparable to the level shifter 302 and pre-driver 304a of FIG. 3A) and a final driver 506 (comparable to the final driver 304b of FIG. 3A), both coupled to a floating reference potential 308 referenced to the source of the associated power FET $M_{CPx}$. The illustrated LDO 502 includes dual full gate-drive LDO sections 508a, 508b, and dual reduced gate-drive LDO sections 510a, 510b. Full gate-drive LDO section 508a and reduced gate-drive LDO section 510a are operational when the power converter is in a DIV2 configuration and generate respective outputs $V_{LDO\_OUT1\_DIV2}$ and $V_{LDO\_OUT2\_DIV2}$. Full gate-drive LDO section 508b and reduced gate-drive LDO section 510b are operational when the power converter is in a DIV3 configuration and generate respective outputs $V_{LDO\_OUT1\_DIV3}$ and $V_{LDO\_OUT2\_DIV3}$.

As illustrated, the outputs of the dual full gate-drive LDO sections 508a, 508b may be directly connected (a "wired-OR" or multiplex connection) to the level shifter/pre-driver 504, as shown, or coupled through a switch (not shown). Similarly, the outputs of the dual reduced gate-drive LDO sections 510a, 510b may be directly connected to the final driver 506. For power FETs $M_{CPx}$ for which a reduced gate-drive voltage is not needed or desired, the LDO 502 may include only the dual full gate-drive LDO sections 508a, 508b, and $V_{LDO\_OUT1\_DIV2}$ and $V_{LDO\_OUT1\_DIV3}$ would be connected directly to the final driver 506 by a conductor 512 (shown as a dashed line).

Figure 5B:
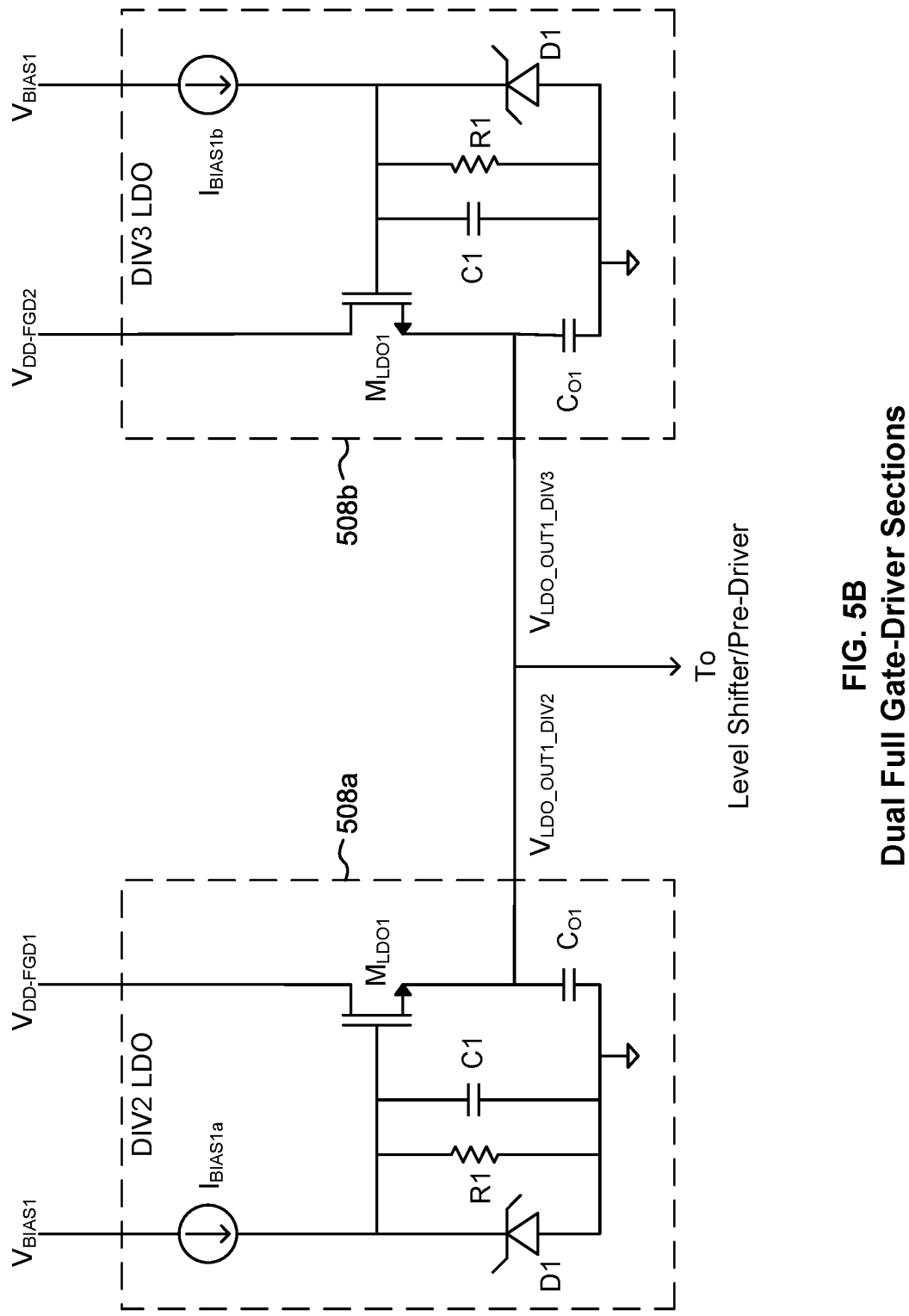
FIG. 5B is a block diagram of the dual full gate-drive LDO sections of FIG. 5A, showing greater detail.

FIG. 5B is a block diagram of the dual full gate-drive LDO sections 508a, 508b of FIG. 5A, showing greater detail. As a comparison with FIG. 3A indicates, each full gate-drive LDO section 508a, 508b is essentially an instance of the full gate-drive LDO section 310 of FIG. 3A, the only differences being that LDO section 508a is supplied by a first voltage $V_{DD-FGD1}$ while LDO section 508b is supplied by a second voltage $V_{DD-FGD2}$.

In DIV3 mode, the $I_{BIAS1b}$ current to full gate-drive LDO section 508b is turned ON while the $I_{BIAS1a}$ current to full gate-drive LDO section 508a is turned OFF. The gates of FET $M_{LDO1}$ in full gate-drive LDO section 508a is pulled down by corresponding resistor R1 to a floating ground. FET $M_{LDO1}$ in LDO section 508a is OFF, and $M_{LDO1}$ in LDO section 508b is ON, providing power to the associated level shifter/pre-driver 504 (and in some cases, to the final driver 506). In DIV2 mode, the reverse configuration is presented, with the $I_{BIAS1a}$ current to full gate-drive LDO section 508a being turned ON while the $I_{BIAS1b}$ current to full gate-drive LDO section 508a is turned OFF. Consequently, full gate-drive LDO section 508a provides power to the associated level shifter/pre-driver 504 (and in some cases, to the final driver 506) and full gate-drive LDO section 508b is OFF.

Figure 5C:
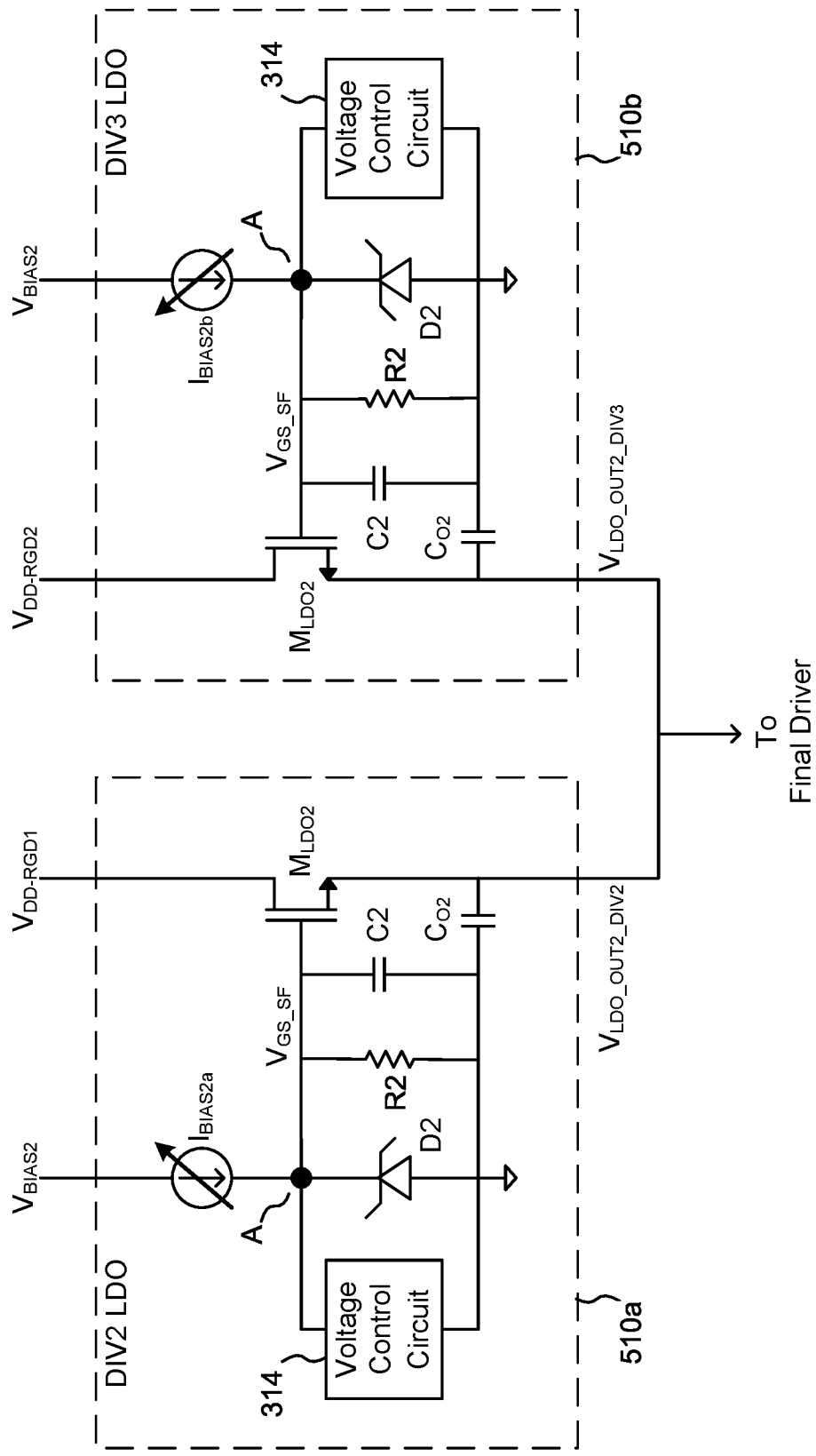
FIG. 5C is a block diagram of the dual reduced gate-drive LDO sections of FIG. 5A, showing greater detail.

FIG. 5C is a block diagram of the dual reduced gate-drive LDO sections 510a, 510b of FIG. 5A, showing greater detail. As a comparison with FIG. 3A indicates, each reduced gate-drive LDO section 510a, 510b is essentially an instance of the reduced gate-drive LDO section 312 of FIG. 3A, the only differences being that LDO section 510a is supplied by a first voltage $V_{DD-RGD1}$ while LDO section 510b is supplied by a second voltage $V_{DD-RGD2}$.

In DIV3 mode, the $I_{BIAS1b}$ current to full gate-drive LDO section 510b is turned ON while the $I_{BIAS1a}$ current to full gate-drive LDO section 510a is turned OFF. Accordingly, $V_{GS\_SF}$ in reduced gate-drive LDO section 510b is set by $I_{BIAS2}$ to that section, and $V_{GS\_SF}$ in reduced gate-drive LDO section 510a is pulled down by corresponding resistor R2 to a floating ground. FET $M_{LDO2}$ in LDO section 510a is OFF, and FET $M_{LDO2}$ in LDO section 510b is ON, providing power to the associated final driver 506. In DIV2 mode, the reverse configuration is presented, with the $I_{BIAS2a}$ current to reduced gate-drive LDO section 510a being turned ON while the $I_{BIAS2b}$ current to reduced gate-drive LDO section 510a is turned OFF. Consequently, reduced gate-drive LDO section 510a provides power to the associated final driver 506 and reduced gate-drive LDO section 510b is OFF.

Figure 5D:
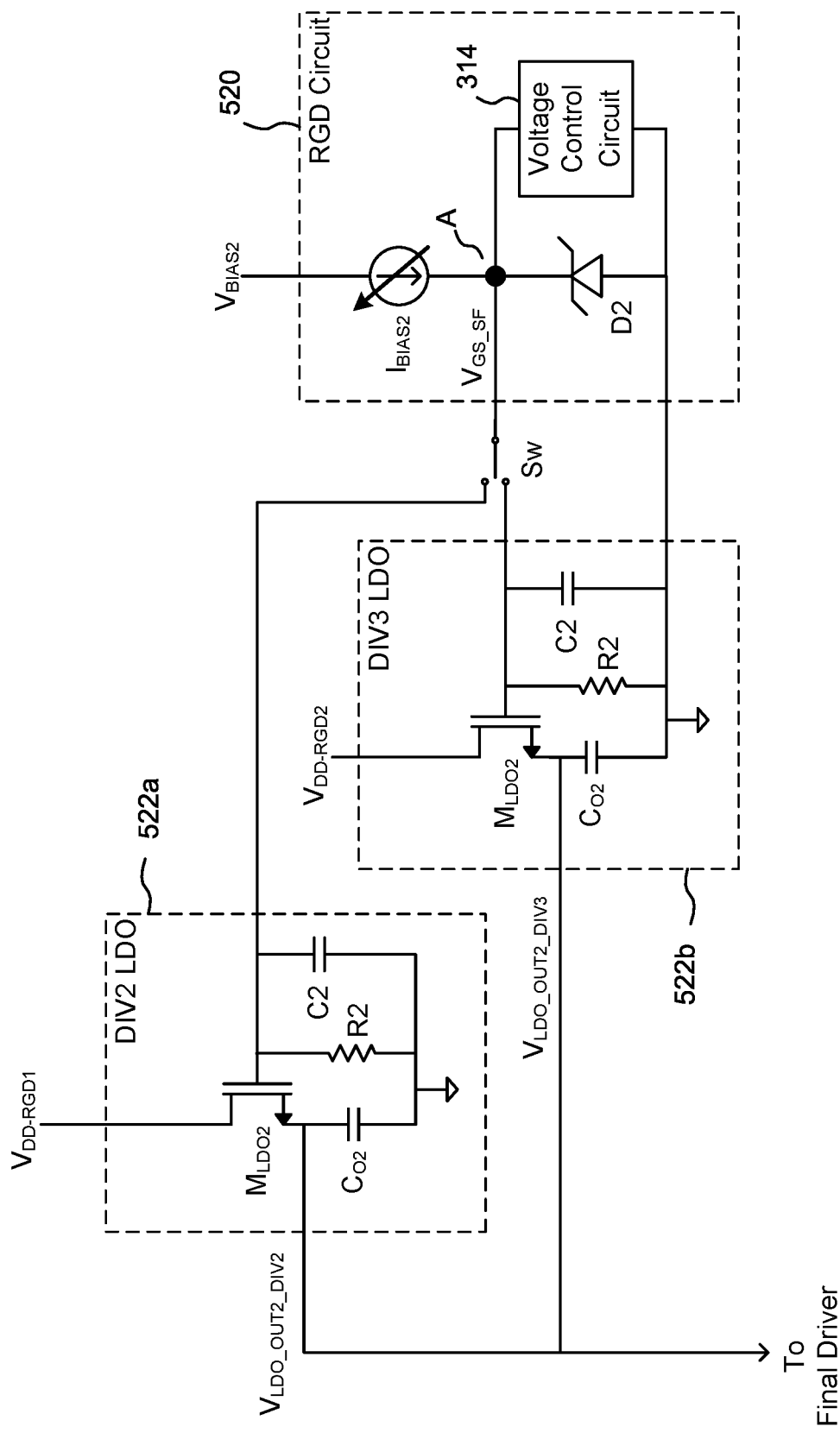
FIG. 5D is a block diagram of an alternative embodiment of the dual reduced gate-drive LDO sections of FIG. 5A.

FIG. 5D is a block diagram of an alternative embodiment of the dual reduced gate-drive LDO sections 510a, 510b of FIG. 5A. In the illustrated embodiment, one instance 520 of each of the variable current source $I_{BIAS2}$, the voltage control circuit 314, and the diode D2 is shared by means of a switch Sw with either a DIV2 circuit 522a or a DIV3 circuit 522b. The state of the switch Sw would be determined by the control circuitry (not shown) that reconfigures the power converter between the DIV2 and DIV3 modes of operation. Setting switch Sw to couple diode D2 to the DIV2 circuit 522a essentially creates a first reduced gate drive circuit, while setting switch Sw to couple diode D2 to the DIV3 circuit 522b essentially creates a second reduced gate drive circuit.

Keeping in mind that a power converter generally has two parallel sections 102a, 102b (see FIG. 1), the type of LDO and the voltage supplies to the LDO associated with each power FET $M_{CPx}$ can be selected for high efficiency. For example, the LDO for power switch S1 in both parallel sections 102a, 102b preferably is of the type shown in FIG. 3A, since a reduced gate-drive capability is generally needed to limit in-rush current but support of "source switching" is not required. The $V_{DD}$ inputs to the full gate-drive LDO section 310 and the reduced gate-drive LDO section 312 may all be supplied by a $V_{BOOST1}$ circuit, as described above, since changing division ratios for the power converter is not a factor. In some embodiments, it may be useful to "wire-OR" the outputs of the $V_{BOOST1}$ circuits to save IC area. The $V_{BIAS}$ inputs to the full gate-drive LDO section 310 and the reduced gate-drive LDO section 312 may be supplied by a $V_{BOOST2}$ circuit, as described above.

As another example, the LDOs for power switches S6 and S7 in both parallel sections 102a, 102b may be just instances of the first LDO section 310 of FIG. 3A, since a reduced gate-drive capability is generally not needed to limit in-rush current and support of "source switching" is not required. The $V_{DD}$ input to the LDO sections 310 may all be supplied by the $V_X$ node voltage. The $V_{BIAS}$ inputs to the to the LDO sections 310 may all be supplied by a $V_{BOOST1}$ circuit, as described above.

In an efficient implementation of a power converter, some of the power FET switches may require dual gate-drive LDO circuits in order to support "source switching". For example, power switches S2 and S4 may use different power supply sources for DIV2 versus DIV3 operational modes for better efficiency. In particular, the $V_{DD\text{-}FGD1}$ and $V_{DD\text{-}RGD1}$ sources in DIV2 mode for power switch S2 in section 102a of a power converter may come from the $V_{BOOST1}$ circuit of the other section 102b of the power converter. Conversely, the $V_{DD\text{-}FGD1}$ and $V_{DD\text{-}RGD1}$ sources in DIV3 mode for the power switch S2 in section 102a of the power converter may come from the $V_{BOOST1}$ circuit coupled to the same section 102a.

As another example, the $V_{DD\text{-}FGD1}$ and $V_{DD\text{-}RGD1}$ sources in DIV2 mode for the power switch S4 in section 102a of a power converter may come from the $V_{C1b}$ node of the other section 102b of the power converter. Conversely, the $V_{DD\text{-}FGD1}$ and $V_{DD\text{-}RGD1}$ sources in DIV3 mode for the power switch S4 in section 102a of the power converter may come from the $V_{C1b}$ node of the same section 102a.

TABLE 2 below shows one set of LDO types and assignments of voltage sources that may be used in conjunction with an efficient power converter. "FGD/RGD" means a full gate-drive/reduced gate-drive LDO of the type shown in FIG. 3A. "FGD" means just the full gate-drive LDO section 310 shown in FIG. 3A (no RGD LDO needed). "Dual FGD/Dual RGD" means a dual full gate-drive/dual reduced gate-drive LDO of the type shown in FIG. 5A. "Dual FGD" means just the dual full gate-drive LDOs 508a, 508b shown in FIG. 5A (no RGD LDOs needed). "Same section" means the section 102a, 102b in which a switch is located. "Other section" means the section 102a, 102b in which a switch is not located (e.g., if a switch is located in section 102a, then section 102b would be the "other section").

TABLE 2

| Switch | LDO Type | DIV2 Voltage Sources for $V_{DD\text{-}FGD1}$ & $V_{DD\text{-}RGD1}$ | DIV3 Voltage Sources for $V_{DD\text{-}FGD2}$ & $V_{DD\text{-}RGD2}$ |
| --- | --- | --- | --- |
| S1 | FGD/RGD | $V_{BOOST1}$ same section | $V_{BOOST1}$ same section |

TABLE 2-continued

| Switch | LDO Type | DIV2 Voltage Sources for $V_{DD\text{-}FGD1}$ & $V_{DD\text{-}RGD1}$ | DIV3 Voltage Sources for $V_{DD\text{-}FGD2}$ & $V_{DD\text{-}RGD2}$ |
| --- | --- | --- | --- |
| S2 | Dual FGD or Dual FGD/ Dual RGD | $V_{BOOST1}$ same section or $V_{C2}$ other section | $V_{BOOST1}$ other section or $V_{C2}$ other section |
| S3 | FGD/RGD or FGD | $V_{C1}$ other section | $V_{C1}$ other section |
| S4 | Dual FGD or Dual FGD/ Dual RGD | $V_{C1}$ same section | $V_{C1}$ same section |
| S5 | FGD or FGD/ RGD | $V_{C1}$ same section | $V_{C1}$ same section |
| S6 | FGD or FGD/ RGD | $V_X$ same section | $V_X$ same section |
| S7 | FGD or FGD/ RGD | $V_X$ same section | $V_X$ same section |

Note that for power switch S2 in DIV2 mode, the voltage source could be "$V_{C2}$ other section". However, using "$V_{BOOST1}$ same section" provides more headroom across pass transistors since "$V_{BOOST1}$ same section" is greater than "$V_{C2}$ other section", and may have other advantages.

Enhanced Embodiments

In some applications using "source switching" dual gate-drive LDOs, situations may arise that affect performance or even cause damage due to the "wired-OR'ing" of two LDO outputs, as shown in FIG. 5A.

As a first example, at high values of $V_{IN}$, a problem may occur in the LDOs for power switch S2 (FET $M_{CP2}$). More specifically, when in the DIV2 mode, the DIV3 side 508b of a dual full gate-driver LDO or the DIV3 side 510b of a dual reduced gate-driver LDO—either of which should be OFF in the DIV2 mode for power switch S2—may be turned ON at high values of $V_{IN}$, creating an undesired discharge path through the DIV3 side circuitry.

Figure 6:
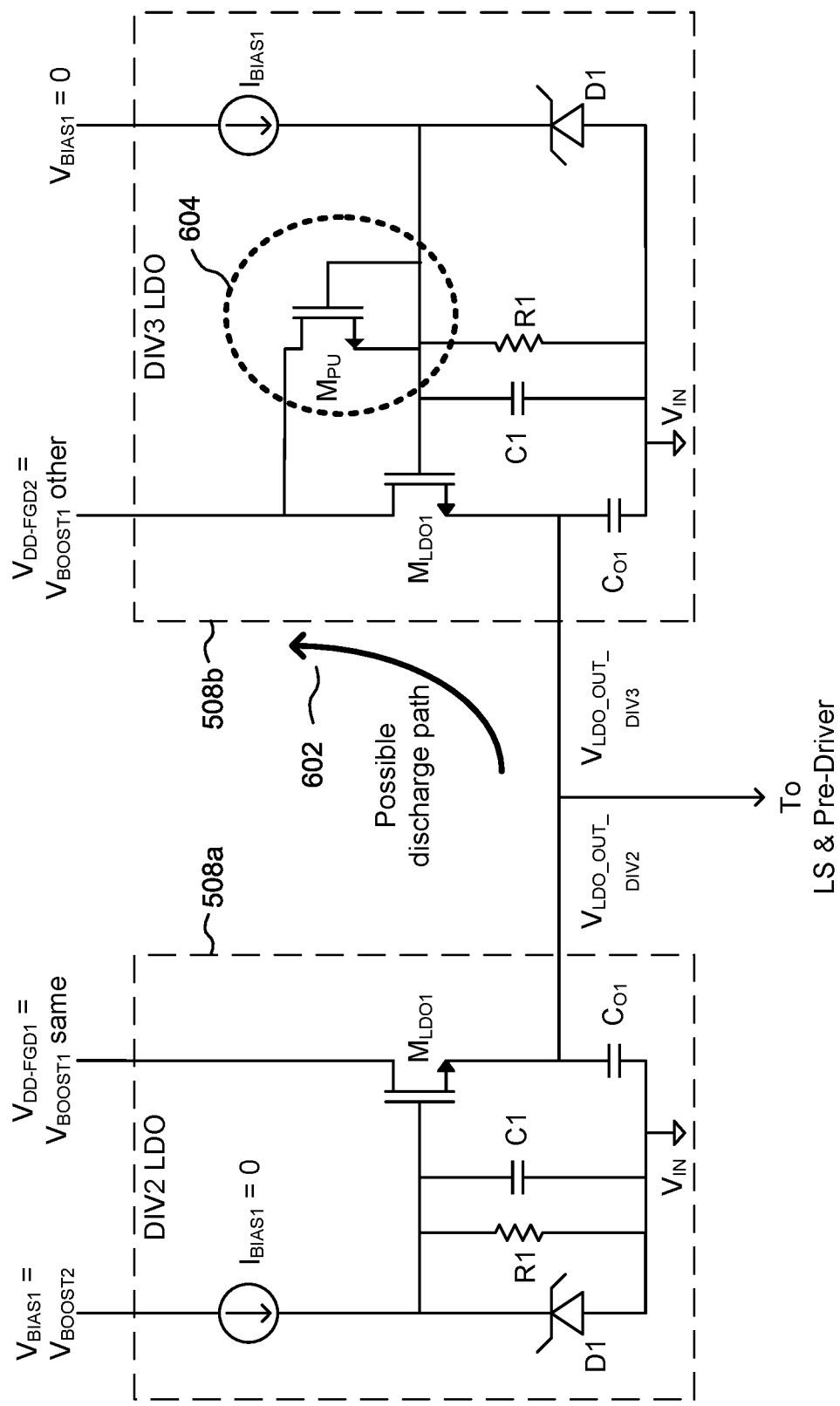
FIG. 6 is a schematic diagram of dual full gate-drive LDO sections in a DIV2 configuration for power switch S2.

For example, FIG. 6 is a schematic diagram of dual full gate-drive LDO sections 508a, 508b in a DIV2 configuration for power switch S2. $V_{BIAS1}$ on the DIV3 side 508b is zero, and thus the gate of FET $M_{LDO1}$ in the DIV3 side 508b is pulled down to the floating ground, which is $V_{IN}$ for power switch S2. However, if $V_{IN}$ is greater than $2*V_Z$ (the voltage drop across the Zener diodes D1), then FET $M_{LDO1}$ in the DIV3 side 508b switches to an ON state (assuming that $V_{TH}$=0V for FET $M_{LDO1}$ in this example). Accordingly, current passing through FET $M_{LDO1}$ in the DIV2 side 508a may discharge through path 602, leaving no or inadequate voltage for the associated level shifter/pre-driver 504 and/or final driver 506. Note that while FIG. 6 shows dual full gate-drive LDO sections 508a, 508b, the same problem exists for dual reduced gate-drive LDO sections 510a, 510b.

FIG. 6 shows a solution to this problem in the form of an added FET pull-up switch $M_{PU}$ (inside dotted oval 604) on the DIV3 side 508b. The conduction channel of FET pull-up switch $M_{PU}$ is coupled between the gate of DIV3-side FET $M_{LDO1}$ and the voltage source coupled to the drain of DIV3-side FET $M_{LDO1}$ ($V_{DD\text{-}FGD2}$ in this example). The gate of FET pull-up switch $M_{PU}$ is coupled to the gates of DIV3-side FET $M_{LDO1}$. FET pull-up switch $M_{PU}$ turns ON when $V_{IN}>2*V_Z$ and pulls the gates of DIV3-side FET $M_{LDO1}$ to "$V_{BOOST1}$ other" (which is greater than $V_{IN}$), thus assuring that DIV3-side FET $M_{LDO1}$ is OFF at high values of $V_{IN}$, thereby closing off the discharge path 602.

As a second example of a situation that may arise that affects performance or even causes damage, during DIV3 to DIV2 mode switching, the DIV3 side 508b of a dual full gate-driver LDO or the DIV3 side 510b of a dual reduced gate-driver LDO may not fully turn OFF before the corresponding DIV2 side turns ON, which can cause shoot-through which may damage the power converter.

Figure 7A:
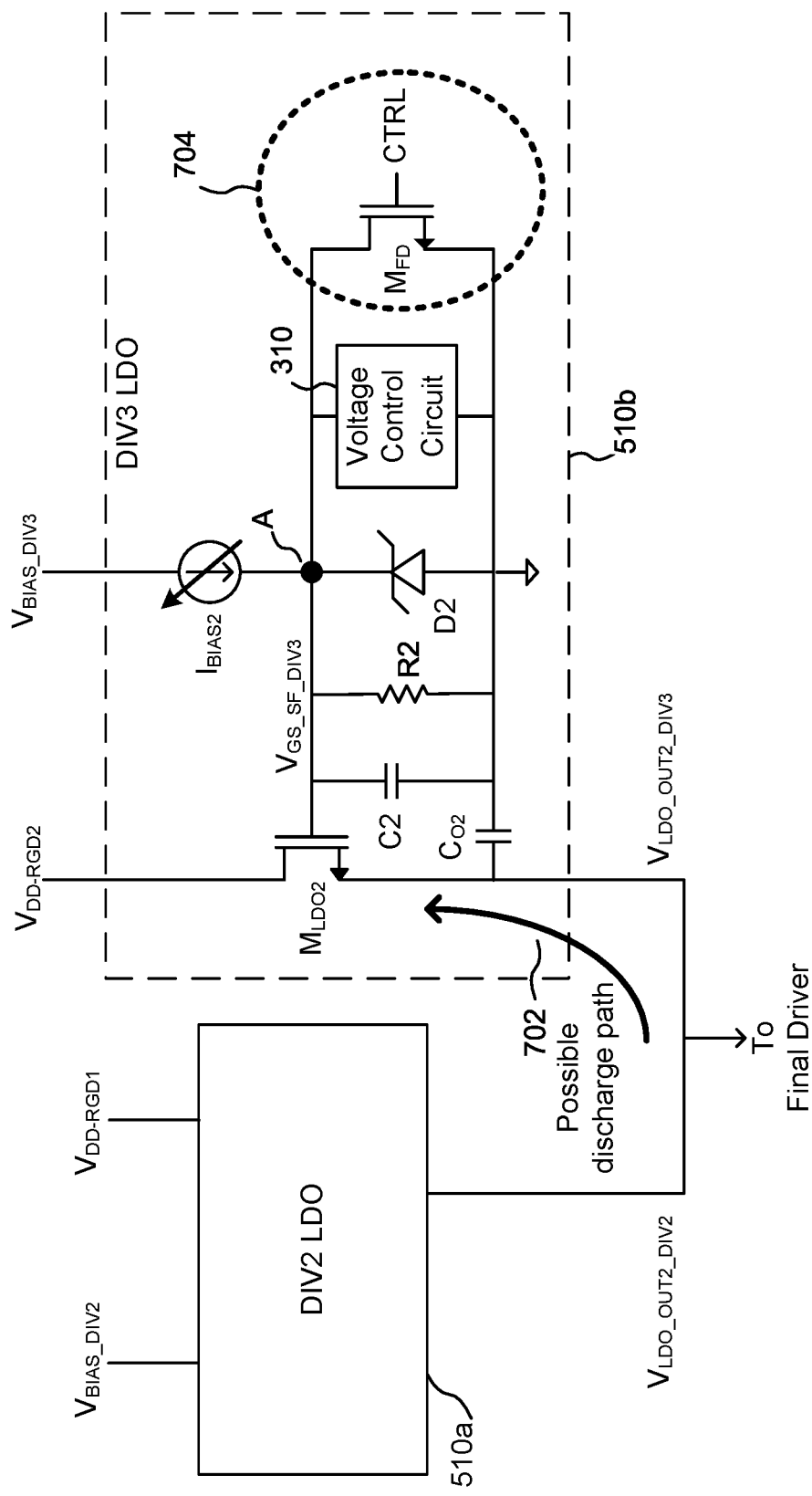
FIG. 7A is a schematic diagram of dual reduced gate-drive LDO sections for an LDO transitioning from a DIV3 to a DIV2 mode.

For example, FIG. 7A is a schematic diagram of dual reduced gate-drive LDO sections 510a, 510b for an LDO transitioning from a DIV3 to a DIV2 mode. FIG. 7B is a set of graphs of current and voltage as a function of time for a dual reduced gate-drive LDO depicting the issue of ON-time overlap. Note that while FIG. 7A shows dual full gate-drive LDO sections 508a, 508b, the same problem exists for dual reduced gate-drive LDO sections 510a, 510b.

Referring to FIG. 7B, when the bias current $I_{BIAS\_DIV3}$ to the DIV3-side of a dual full gate-driver LDO is high, then the gate voltage $V_{GS\_SF\_DIV3}$ to the DIV3-side FET $M_{LDO2}$ is high and that FET conducts (i.e., the DIV3 side is ON). When the bias current $I_{BIAS\_DIV2}$ to the DIV2-side of a dual full gate-driver LDO is low, then the gate voltage $V_{GS\_SF\_DIV2}$ to the DIV2-side FET $M_{LDO2}$ is low and that FET conducts (i.e., the DIV2 side is OFF). Without a corrective circuit, when the dual full gate-driver LDO switches from DIV3 mode to DIV2 mode, the gate of the DIV3-side FET $M_{LDO2}$ takes an appreciable time (the C2*R2 time constant for the DIV3 side) to discharge as the FET transitions from ON to OFF. Thus, there is a period of time when both the DIV3-side and the DIV2-side of the dual full gate-driver LDO are ON. Accordingly, current passing through the DIV2-side FET $M_{LDO2}$ may discharge through path 702, leaving no or inadequate voltage for the associated level shifter/pre-driver 504 and/or final driver 506.

To resolve this potential problem, a fast-discharge switch $M_{FD}$ (inside dotted oval 704) is added with its conduction channel coupled to node A and a floating ground. The gate of the fast-discharge switch $M_{FD}$ would be coupled to a control signal CTRL that sets $M_{FD}$ to an ON (conductive) state during DIV3 to DIV2 transitions, thus enabling the gate of the DIV3-side FET $M_{LDO2}$ to quickly discharge. The result is that the DIV3 side quickly turns OFF before the DIV2 side turns ON, ensuring no overlap between the LDO ON states and eliminating the possible discharge path 702. FIG. 7C is a set of graphs of current and voltage as a function of time for a dual reduced gate-drive LDO that includes the fast-discharge switch $M_{FD}$ of FIG. 7A. During a transition from a DIV3 mode to a DIV2 mode, control circuitry (not shown) would assert the CTRL signal, thus turning $M_{FD}$ ON and thereby coupling the gates of the DIV3-side FET $M_{LDO2}$ to the floating ground, consequently rapidly discharging those gates. Accordingly, the DIV3-side FET $M_{LDO2}$ quickly turns OFF before the DIV2-side FET $M_{LDO2}$ turns ON.

It should be appreciated that a dual gate-drive LDO embodiment may include both the fast-discharge switch $M_{FD}$ of FIG. 7A and the pull-up switch $M_{PU}$ of FIG. 6. The use of a fast-discharge switch $M_{FD}$ and/or a pull-up switch $M_{PU}$ with "wired-OR" connections of "source switching" dual gate-drive LDOs avoids having to place extra switches in the output paths of the LDO sections, which increases efficiency.

Benefits

Embodiments of the present invention may some or all of the following advantages: a current limiting value that is independent of a power converter switching frequency, device mismatches and process, voltage, and/or temperature (PVT) variations; accurate soft-start current limiting; reliable operation of power FETs in power converters having reconfigurable conversion ratios when dynamically changing conversion ratios; the ability to keep a level output voltage when a power converter operates at full load in different operating and PVT conditions; and high efficiency through the use of existing voltage nodes within a power converter to power specific power FETs.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end-product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 8:
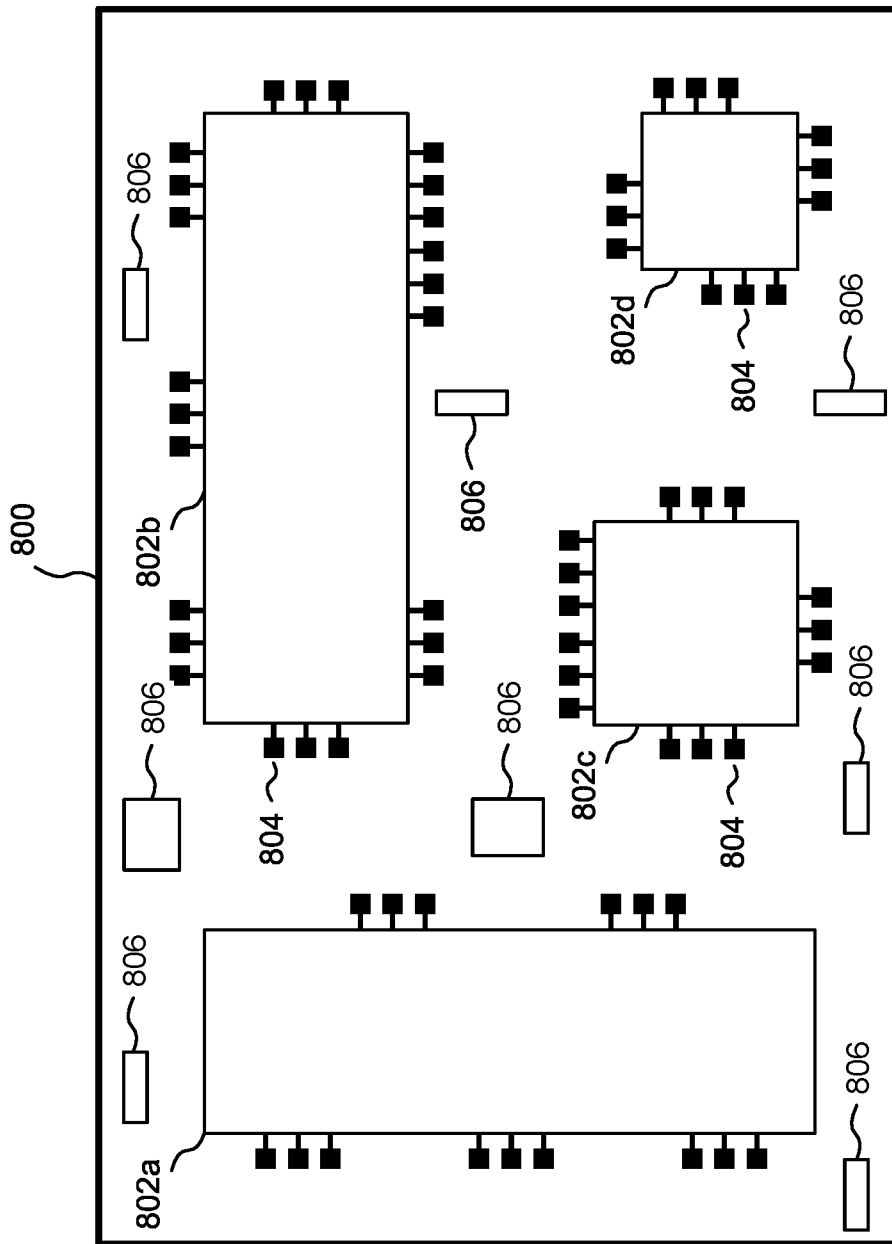
FIG. 8 is a top plan view of a substrate that may be, for example, a printed circuit board or chip module substrate (e.g., a thin-film tile).

As one example of further integration of embodiments of the present invention with other components, FIG. 8 is a top plan view of a substrate 800 that may be, for example, a printed circuit board or chip module substrate (e.g., a thin-film tile). In the illustrated example, the substrate 800 includes multiple ICs 802a-802d having terminal pads 804 which would be interconnected by conductive vias and/or traces on and/or within the substrate 800 or on the opposite (back) surface of the substrate 800 (to avoid clutter, the surface conductive traces are not shown and not all terminal pads are labelled). The ICs 802a-802d may embody, for example, signal switches, active filters, amplifiers (including one or more LNAs), and other circuitry. For example, IC 802b may incorporate one or more instances of an enhanced LDO power supply circuit like the circuits shown in FIGS. 3A, 5A-5D, 6, and/or 7A.

The substrate 800 may also include one or more passive devices 806 embedded in, formed on, and/or affixed to the substrate 800. While shown as generic rectangles, the passive devices 806 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 800 to other passive devices 806 and/or the individual ICs 802a-802d. The front or back surface of the substrate 800 may be used as a location for the formation of other structures.

System Aspects

Embodiments of the present invention are useful in a wide variety of applications, including portable computing devices (e.g., laptops, notebooks, cell phones, tablets), datacenters and telecom centers that have battery backup systems, household appliances and electronics, vehicles (e.g., automobiles, drones, planes, boats, trains, ships), general purpose DC/DC and AC/DC power converters, and radio frequency (RF) circuits and systems.

Radio system usage may include wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be) protocols, as well as other radio communication standards and protocols.

Methods

Another aspect of the invention includes methods providing power to at least one voltage input node of a target circuit. For example, FIG. 9 is a process flow chart 900 showing a method of providing power to a voltage input node of a target circuit. The method includes: coupling a first low-dropout circuit between a first voltage source and the voltage input node of the target circuit, the first low-dropout circuit including a first transistor (e.g., FET) circuit configured to selectively apply a first voltage to the voltage input node of the target circuit [Block 902]; and coupling a second low-dropout circuit between a second voltage source and the voltage input node of the target circuit, the second low-dropout circuit including a second transistor (e.g., FET) circuit configured to selectively apply a second voltage to the voltage input node of the target circuit [Block 904].

Figure 10:
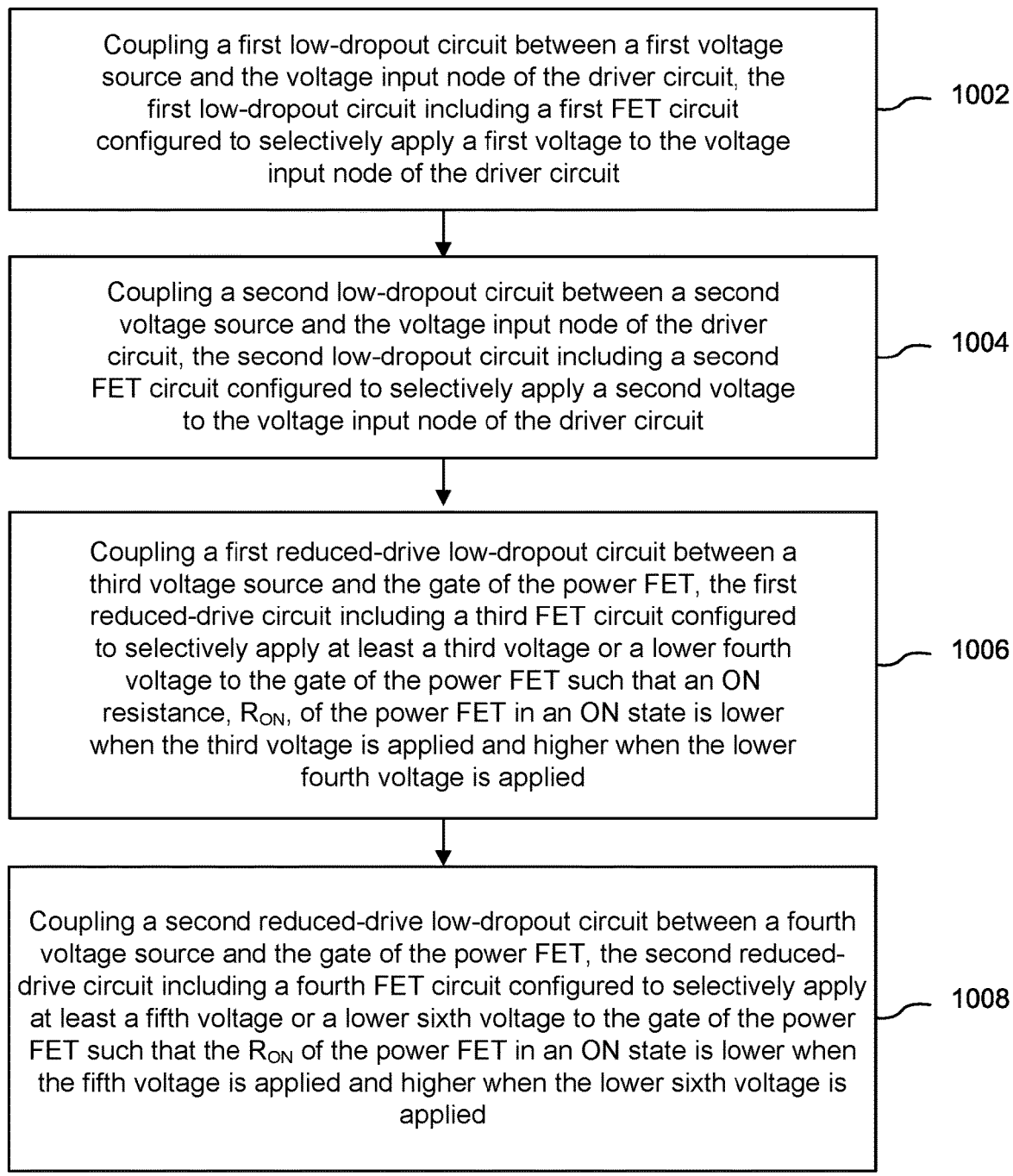
FIG. 10 is a process flow chart showing a method of providing power to a voltage input node of a driver circuit for a power FET having a gate, and to the gate of the power FET.

For example, FIG. 10 is a process flow chart 1000 showing a method of providing power to a voltage input node of a driver circuit for a power FET having a gate, and to the gate of the power FET. The method includes: coupling a first low-dropout circuit between a first voltage source and the voltage input node of the driver circuit, the first low-dropout circuit including a first FET circuit configured to selectively apply a first voltage to the voltage input node of the driver circuit [Block 1002]; coupling a second low-dropout circuit between a second voltage source and the voltage input node of the driver circuit, the second low-dropout circuit including a second FET circuit configured to selectively apply a second voltage to the voltage input node of the driver circuit [Block 1004]; coupling a first reduced-drive low-dropout circuit between a third voltage source and the gate of the power FET, the first reduced-drive circuit including a third FET circuit configured to selectively apply at least a third voltage or a lower fourth voltage to the gate of the power FET such that current flow through the power FET in an ON state is higher when the third voltage is applied and lower when the lower fourth voltage is applied [Block 1006]; and coupling a second reduced-drive low-dropout circuit between a fourth voltage source and the gate of the power FET, the second reduced-drive circuit including a fourth FET circuit configured to selectively apply at least a fifth voltage or a lower sixth voltage to the gate of the power FET such that current flow through the power FET in an ON state is higher when the fifth voltage is applied and lower when the lower sixth voltage is applied [Block 1008].

Additional aspects of the above methods may include one or more of the following: wherein the first voltage source is the same as the second voltage source; wherein the first voltage source is different from the second voltage source; wherein the third voltage source is the same as the fourth voltage source; wherein the third voltage source is different from the fourth voltage source; selectively applying one of the lower fourth voltage or the lower sixth voltage to restrict flow of excess current through the power FET; wherein the first FET circuit or the third FET circuit of at least one of the first full-drive low-dropout circuit or the first reduced-drive low-dropout circuit includes a FET having a gate, and further including coupling a conduction channel of a pull-up FET between the gate of the FET and a respective one of the first voltage source or the third voltage source, and coupling a gate of the pull-up FET to the gate of the FET; wherein the first FET circuit or the third FET circuit of at least one of the first full-drive low-dropout circuit or the first reduced-drive low-dropout circuit includes a FET having a gate, and further including coupling a conduction channel of a fast-discharge FET between the gate of the FET and a reference potential, coupling a gate of the fast-discharge FET to a control signal, and selectively asserting the control signal to cause the fast-discharge FET to discharge the gate of the FET; and/or wherein the first reduced-drive low-dropout circuit and the second reduced-drive low-dropout circuit each include a voltage control circuit, wherein each voltage control circuit includes a switch, a first diode-connected FET, and at least one additional diode-connected FET, wherein the switch, the first diode-connected FET, and the at least one additional diode-connected FET are coupled in series between a reference potential and the respective first or second FET circuit.

Fabrication Technologies & Options

FIGS. 5B and 5C show the LDO sections as being "wired-OR" to a level shifter/pre-driver, final driver, or power FET gate on the source side of the FETs $M_{LDO1}$ or $M_{LDO2}$. In alternative embodiments of power converters implemented with P-type FETs (PFETs), the LDO sections may be essentially "flipped" upside-down and implemented with PFETs to provide a suitable polarity output voltage from the drain side of the FETs. Thus, for example, the ground connection shown in FIGS. 5B and 5C would become a positive voltage rail $V_{IN}$, and the various voltage sources (e.g., $V_{BIAS1}$, $V_{BIAS2}$, $V_{DD-FGD1}$, $V_{DD-FGD2}$, $V_{DD-RGD1}$, and $V_{DD-RGD2}$) would be negative voltages with respect to $V_{IN}$. The current sources would become current sinks, and the polarity of the diodes D1, D2 would be reversed (e.g., cathode coupled to $V_{IN}$). The "wired-OR" connection to a level shifter/pre-driver, final driver, or power FET gate would be from the drain side of the FETs within the LDO sections. Otherwise, operation remains essentially the same as an N-type FET embodiment. As should be apparent, the circuits of FIGS. 5D, 6, and 7A may also be implemented with PFETs.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as BJT, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A dual low-dropout circuit configuration for regulating current flow through a power FET having a gate, including:
   (a) a driver circuit having a voltage input node for powering the driver circuit, an input for receiving a drive signal, and an output coupled to the gate of the power FET, the driver circuit configured to control current flow through the power FET;
   (b) a first low-dropout circuit for regulating current flow through the power FET, the first low-dropout circuit including a first FET circuit having a control gate and configured to be coupled between a first voltage source and the voltage input node of the driver circuit, the first low-dropout circuit configured to selectively apply at least a first voltage or a lower second voltage to the voltage input node such that current flow through the power FET in an ON state is higher when the first voltage is applied and lower when the lower second voltage is applied;
   (c) a first voltage control circuit including a switch, a diode-connected FET, and at least one additional diode-connected FET coupled in series between a reference potential and the control gate of the first FET circuit;
   (d) a second low-dropout circuit for regulating current flow through the power FET, the second low-dropout circuit including a second FET circuit having a control gate and configured to be coupled between a second voltage source and the same voltage input node of the driver circuit, the second low-dropout circuit configured to selectively apply at least a third voltage or a lower fourth voltage to the same voltage input node such that current flow through the power FET in an ON state is higher when the third voltage is applied and lower when the lower fourth voltage is applied; and
   (e) a second voltage control circuit including a switch, a diode-connected FET, and at least one additional diode-connected FET coupled in series between the reference potential and the control gate of the second FET circuit.

2. The invention of claim 1, wherein the lower second voltage and the lower fourth voltage are applied to restrict flow of excess current through the power FET.

3. The invention of claim 1, further including a pull-up FET having (1) a conduction channel coupled between the first voltage source and the control gate of the first FET circuit, and (2) a gate coupled to the control gate of the first FET circuit.

4. The invention of claim 1, further including a discharge FET having (1) a conduction channel coupled between the control gate of the first FET circuit and a reference potential, and (2) a gate coupled to a control signal, wherein when the control signal is asserted, the discharge FET discharges the control gate of the first FET circuit.

5. The invention of claim 1, further including:
   (a) a pull-up FET having (1) a conduction channel coupled between the first voltage source and the control gate of the first FET circuit, and (2) a gate coupled to the control gate of the first FET circuit; and
   (b) a discharge FET having (1) a conduction channel coupled between the control gate of the first FET circuit and a reference potential, and (2) a gate coupled to a control signal, wherein when the control signal is asserted, the discharge FET discharges the control gate of the first FET circuit.

6. A low-dropout circuit configuration configured to be coupled to a first voltage input node of a pre-driver circuit and to a second voltage input node of a driver circuit for a power FET having a gate, the low-dropout circuit configuration including:
  (a) a first full-drive low-dropout circuit including a first FET circuit configured to be coupled between a first voltage source and the first voltage input node of the pre-driver circuit, the first full-drive low-dropout circuit configured to selectively apply a first voltage to the first voltage input node of the pre-driver circuit; and
  (b) a second full-drive low-dropout circuit including a second FET circuit configured to be coupled between a second voltage source and the first voltage input node of the pre-driver circuit, the second full-drive low-dropout circuit configured to selectively apply a second voltage to the first voltage input node of the pre-driver circuit;
  (c) a first reduced-drive low-dropout circuit for regulating current flow through the power FET, the first reduced-drive low-dropout circuit including a third FET circuit configured to be coupled between a third voltage source and the second voltage input node of the driver circuit, the first reduced-drive low-dropout circuit configured to selectively apply at least a third voltage or a lower fourth voltage to the second voltage input node such that current flow through the power FET in an ON state is higher when the third voltage is applied and lower when the lower fourth voltage is applied; and
  (d) a second reduced-drive low-dropout circuit for regulating current flow through the power FET, the second reduced-drive low-dropout circuit including a fourth FET circuit configured to be coupled between a fourth voltage source and the second voltage input node of the driver circuit, the second reduced-drive low-dropout circuit configured to selectively apply at least a fifth voltage or a lower sixth voltage to the second voltage input node such that current flow through the power FET in an ON state is higher when the fifth voltage is applied and lower when the lower sixth voltage is applied.

7. The invention of claim 6, wherein the first voltage source is different from the second voltage source.

8. The invention of claim 6, wherein the third voltage source is different from the fourth voltage source.

9. The invention of claim 6, wherein the lower fourth voltage and the lower sixth voltage are applied to restrict flow of excess current through the power FET.

10. The invention of claim 6, wherein the first FET circuit or the third FET circuit of at least one of the first full-drive low-dropout circuit or the first reduced-drive low-dropout circuit includes a FET having a gate, further including a pull-up FET having (1) a conduction channel coupled between (a) the respective first voltage source or third voltage source and (b) the gate of the FET, and (2) a gate coupled to the gate of the FET.

11. The invention of claim 6, wherein the first FET circuit or the third FET circuit of at least one of the first full-drive low-dropout circuit or the first reduced-drive low-dropout circuit includes a FET having a gate, further including a discharge FET having (1) a conduction channel coupled between the gate of the FET and a reference potential, and (2) a gate coupled to a control signal, wherein when the control signal is asserted, the discharge FET discharges the gate of the FET.

12. The invention of claim 6, wherein the first FET circuit or the third FET circuit of at least one of the first full-drive low-dropout circuit or the first reduced-drive low-dropout circuit includes a FET having a gate, further including:
  (a) a pull-up FET having (1) a conduction channel coupled between (a) the respective first voltage source or third voltage source and (b) the gate of the FET, and (2) a gate coupled to the gate of the FET; and
  (b) a discharge FET having (1) a conduction channel coupled between the gate of the FET and a reference potential, and (2) a gate coupled to a control signal, wherein when the control signal is asserted, the discharge FET discharges the gate of the FET.

13. The invention of claim 6, wherein the first reduced-drive low-dropout circuit and the second reduced-drive low-dropout circuit each include a voltage control circuit, wherein each voltage control circuit includes:
  (a) a switch;
  (b) a first diode-connected FET; and
  (c) at least one additional diode-connected FET;
    wherein the switch, the first diode-connected FET, and the at least one additional diode-connected FET are coupled in series between a reference potential and the respective first or second FET circuit.

* * * * *

UNITED STATES PATENT AND TRADEMARK OFFICE
CERTIFICATE OF CORRECTION

PATENT NO. : 12,184,174 B2
APPLICATION NO. : 17/960712
DATED : December 31, 2024
INVENTOR(S) : Antony Christopher Routledge and Satish Kumar Vangara Page 1 of 1

It is certified that error appears in the above-identified patent and that said Letters Patent is hereby corrected as shown below:

In the Specification

In the CROSS-REFERENCE TO RELATED APPLICATIONS:

Column 1, Lines 6-7, change "U.S. patent application Ser. No." to --U.S. Patent Application No.--.

Column 6, Line 16, change "U.S. patent application Ser. No." to --U.S. Patent Application No.--.

Column 6, Line 50, change "U.S. patent application Ser. No." to --U.S. Patent Application No.--.

Column 7, Line 19, change "U.S. patent application Ser. No." to --U.S. Patent Application No.--.

Signed and Sealed this
Twenty-eighth Day of January, 2025

Coke Morgan Stewart
*Acting Director of the United States Patent and Trademark Office*